(12) United States Patent
Kondo

(10) Patent No.: US 12,528,299 B2
(45) Date of Patent: Jan. 20, 2026

(54) COLOR CALIBRATION BASED ON POSITION OF SELECTED COLOR ON REVIEW IMAGE

(71) Applicant: BROTHER KOGYO KABUSHIKI KAISHA, Nagoya (JP)

(72) Inventor: Tomoya Kondo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 155 days.

(21) Appl. No.: 18/341,057

(22) Filed: Jun. 26, 2023

(65) Prior Publication Data

US 2024/0001687 A1    Jan. 4, 2024

(30) Foreign Application Priority Data

Jun. 30, 2022    (JP) ................. 2022-106577

(51) Int. Cl.
    *B41J 2/21*    (2006.01)
    *G06K 15/02*    (2006.01)

(52) U.S. Cl.
    CPC .......... *B41J 2/2132* (2013.01); *G06K 15/027* (2013.01); *G06K 15/1802* (2013.01); *G06K 15/1828* (2013.01)

(58) Field of Classification Search
    CPC ... B41J 2/2132; B41J 2202/21; G06K 15/027; G06K 15/1802; G06K 15/1828; G06K 15/129; H04N 1/6033
    See application file for complete search history.

(56) References Cited

U.S. PATENT DOCUMENTS 11,356,581 B2 *    6/2022    Kasahara ................. H04N 1/54
2021/0014370 A1 *    1/2021    Shinya ................. H04N 1/2338

FOREIGN PATENT DOCUMENTS

JP    2010-157920 A    7/2010
JP    2014-159103 A    9/2014

* cited by examiner

*Primary Examiner* — Bradley W Thies
(74) *Attorney, Agent, or Firm* — Scully, Scott, Murphy & Presser, P.C.

(57) ABSTRACT

A printing device includes a printing engine, a storage unit, and a controller. The printing engine prints on a printing medium. The storage unit stores an overall patch image including patches for color calibration for printing an image based on image data. The patches include basic patches corresponding to predetermined colors. The overall patch image has a first patch area in which the basic patches are arranged and a second patch area different from the first patch area. The controller performs: generating a specified patch that is a patch for a color specified by a user in a preview image corresponding to the image; and printing the overall patch image using the printing engine. In a case where the specified patch is generated, in the printing the generated specified patch is printed in the first patch area and one of the basic patches is printed in the second patch area.

16 Claims, 21 Drawing Sheets

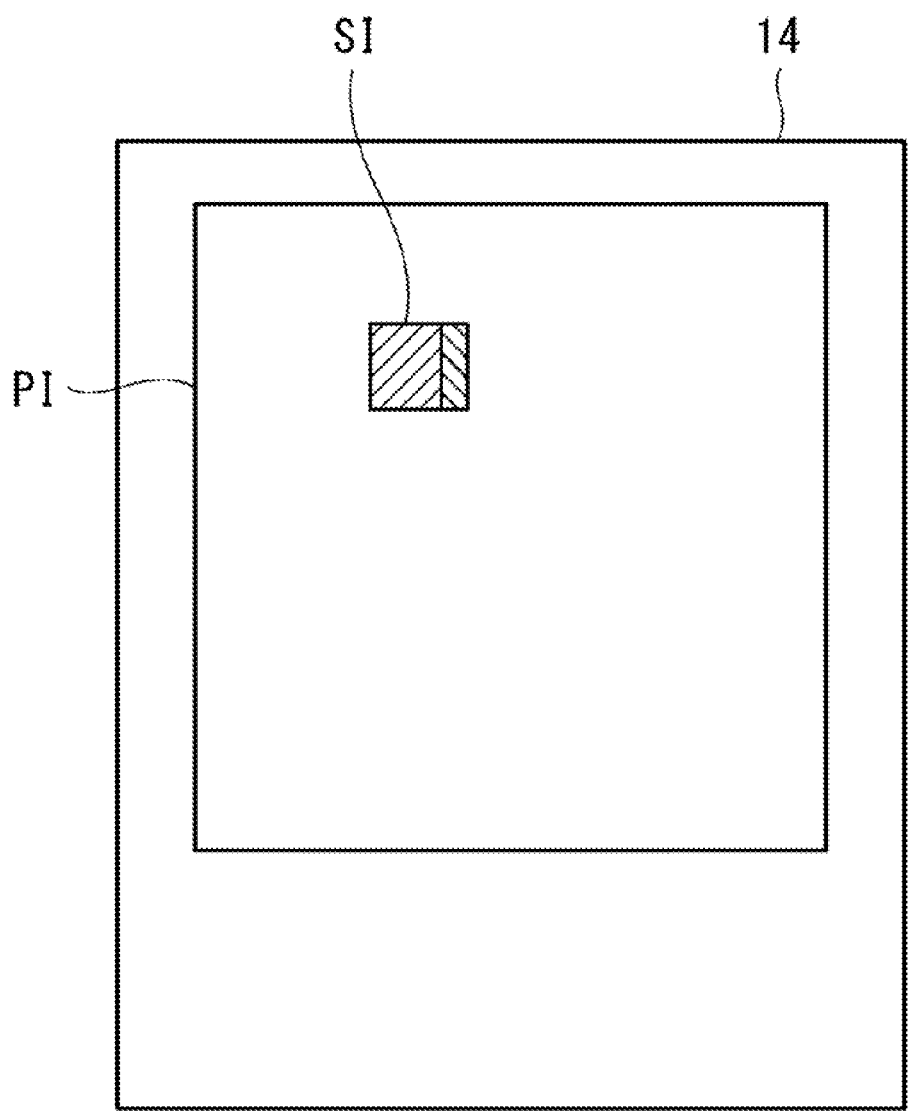

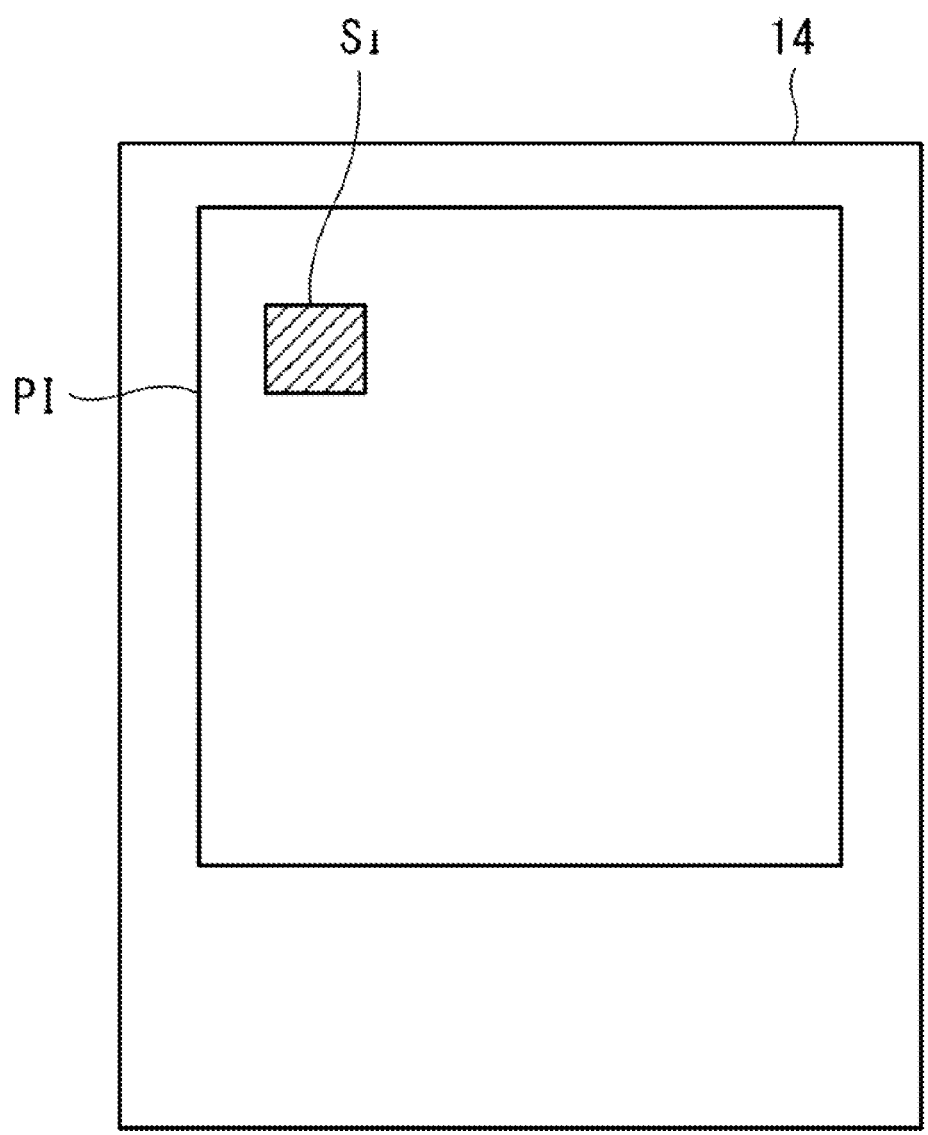

COLOR CALIBRATION BASED ON POSITION OF SELECTED COLOR ON REVIEW IMAGE

REFERENCE TO RELATED APPLICATIONS

This application claims priority from Japanese Patent Application No. 2022-106577 filed on Jun. 30, 2022. The entire content of the priority application is incorporated herein by reference.

BACKGROUND ART

There have been conventionally known some printer configured to display a preview screen of the data to be printed and to prompt the user to specify a color for which the user wishes to create a patch. The conventional printers print a patch in the user-specified color together with existing color gamut patches. The conventional printers use a colorimeter to measure all the patches printed for calibration to thereby obtain colorimetric data. The conventional printers perform color calibration on the image data to be printed based on the obtained colorimetric data.

DESCRIPTION

However, printed colors often differ according to the printing conditions, even when the data represents the same color. For example, a printer provided with two conveying rollers may print the middle section of a printing medium while the printing medium is supported by both conveying rollers but may print the area near the downstream edge or the upstream edge of the printing medium while the printing medium is supported by only one of the conveying rollers. Since support of the printing medium is less stable when the medium is supported by only a single conveying roller than when the medium is supported by both conveying rollers, differences in color reproducibility can occur.

In view of the foregoing, it is an object of the present disclosure to provide a printing device, printing method, and non-transitory computer-readable storage medium capable of improving the accuracy of color calibration.

In order to attain the above and other object, according to one aspect, the present disclosure provides a printing device including a printing engine, a storage unit, and a controller. The printing engine is configured to print an image on a printing medium based on image data. The storage unit stores an overall patch image including a plurality of patches for color calibration for printing the image. The plurality of patches includes a plurality of basic patches corresponding to a plurality of predetermined colors. The overall patch image has a first patch area in which the plurality of basic patches is arranged and a second patch area different from the first patch area. The controller is configured to perform: (a) generating a specified patch, the specified patch being a patch for a specified color, the specified color being a color which a user has specified in a preview image corresponding to the image; and (b) printing the overall patch image using the printing engine. In a case where the specified patch is generated in (a), in the printing in (b) the specified patch generated in (a) is printed in the first patch area and one of the plurality of basic patches is printed in the second patch area.

According to another aspect, the present disclosure provides a printing method. The printing method including: (a) storing an overall patch image including a plurality of patches for color calibration for printing an image based on image data, the plurality of patches including a plurality of basic patches corresponding to a plurality of predetermined colors, the overall patch image having a first patch area in which the plurality of basic patches is arranged and a second patch area different from the first patch area; (b) generating a specified patch, the specified patch being a patch for a specified color, the specified color being a color which a user has specified in a preview image corresponding to the image; and (c) printing the overall patch image. In a case where the specified patch is generated in (b), in the printing in (c) the specified patch generated in (b) is printed in the first patch area and one of the plurality of basic patches is printed in the second patch area.

According to sill another aspect, the present disclosure provides a non-transitory computer-readable storage medium storing a set of instructions for a printing device. The printing device includes a controller and a printing engine configured to print an image on a printing medium based on image data. The set of instructions, when executed by the controller, causes the printing device to perform: (a) storing an overall patch image including a plurality of patches for color calibration for printing the image, the plurality of patches including a plurality of basic patches corresponding to a plurality of predetermined colors, the overall patch image having a first patch area in which the plurality of basic patches is arranged and a second patch area different from the first patch area; (b) generating a specified patch, the specified patch being a patch for a specified color, the specified color being a color which a user has specified in a preview image corresponding to the image; and (c) printing the overall patch image using the printing engine. In a case where the specified patch is generated in (b), in the printing in (c) the specified patch generated in (b) is printed in the first patch area and one of the plurality of basic patches is printed in the second patch area.

FIG. 5A illustrates another example of a specified image that a user has specified in a preview image displayed on the display device.

FIG. 6A illustrates another example of a specified image that a user has specified in a preview image of image data displayed on the display device.

Next, printing devices according to embodiments of the present disclosure will be described while referring to the accompanying drawings. The printing devices in the following description are each merely one embodiment of the present disclosure. Therefore, the present disclosure is not limited to the following embodiments, and elements may be added, omitted, and modified without departing from the spirit of the present disclosure.

Figure 1:
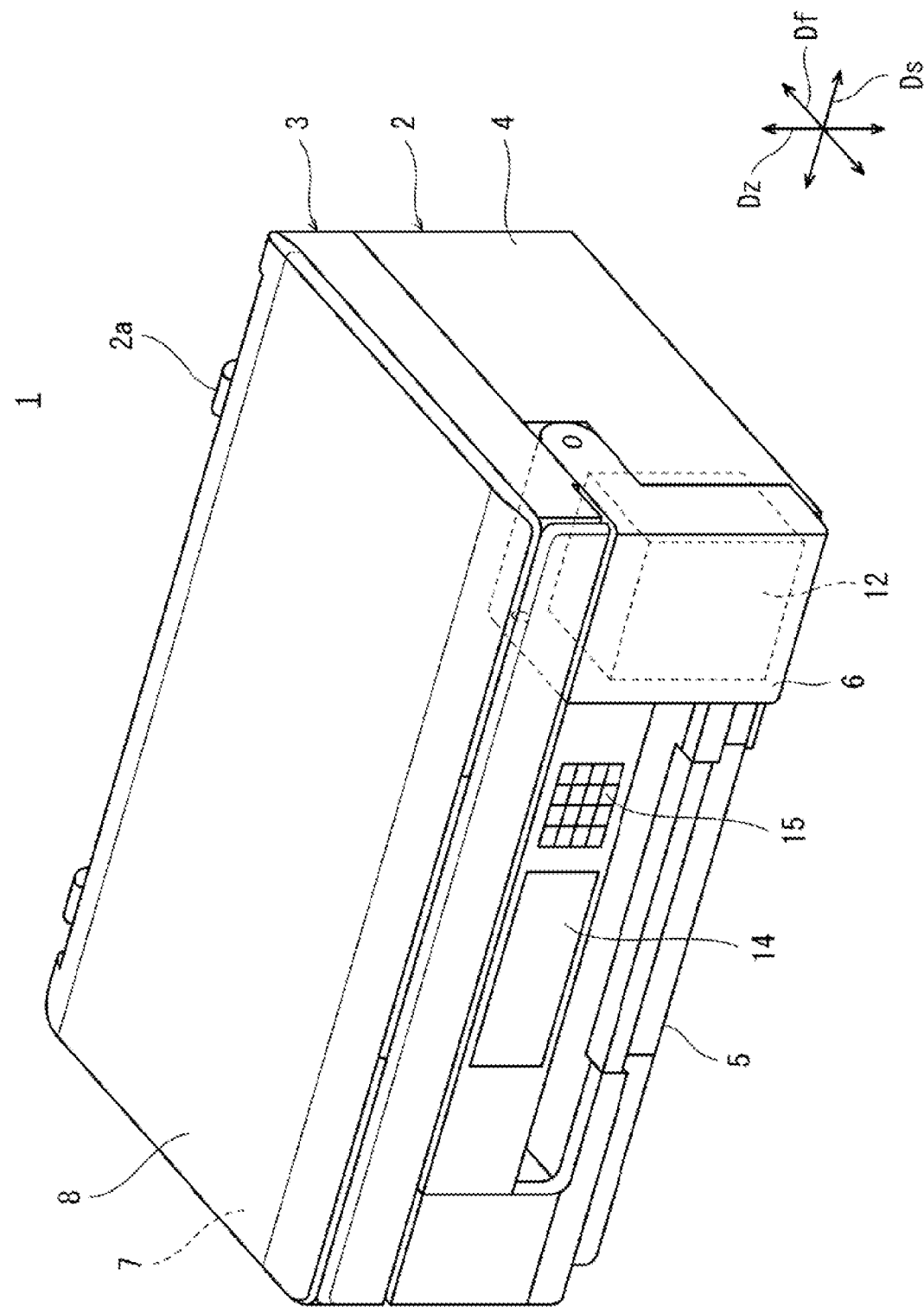
FIG. 1 is a perspective view of the appearance of a printing device.

FIG. 1 is a perspective view showing the appearance of a printing device 1 according to one embodiment of the present disclosure. In FIG. 1, a first direction Ds, a second direction Df, and a third direction Dz are each orthogonal to the others. In this embodiment, the first direction Ds is the moving direction of a carriage 41 described later, the second direction Df is the conveying direction of a printing medium W described later, and the third direction Dz is the up-down direction, for example. Thus, in the following description, Ds will be called the moving direction, Df will be called the conveying direction, and Dz will be called the up-down direction.

As shown in FIG. 1, the printing device 1 is an inkjet printer configured to print images on a printing medium W (see FIG. 2), such as a printing paper. The exterior of the printing device 1 has a parallelepiped shape. The printing device 1 includes a printing unit 2, and a scanning unit 3. However, the printing device 1 in FIG. 1 is merely an example and is not limited to this configuration. For example, the printing device 1 may be a printing device including a printing engine (ejection head) configured to eject UV-curable ink droplets, and a light source configured to cure the ink droplets with ultraviolet light.

The scanning unit 3 has an image sensor configured to read images and generate image data. The printing unit 2 is configured to print this generated image data on a printing medium W either accommodated in the printing device 1 or supplied into the printing device 1 from outside. The scanning unit 3 having this configuration is arranged on top of the printing unit 2 and is coupled to the printing unit 2 by coupling parts 2a provided on the rear portion of the printing unit 2. When the front portion of the scanning unit 3 is lifted, the scanning unit 3 pivotally moves upward about the coupling parts 2a, exposing the inside of the printing unit 2.

The scanning unit 3 includes a document platen 7, and a cover 8. The cover 8 is arranged to cover the top of the document platen 7. The scanning unit 3 is configured to scan images recorded on an original while the original is positioned between the document platen 7 and cover 8.

The printing unit 2 is configured to print images on printing media W with ink supplied from tanks 12 described later. The printing unit 2 includes a case 4 that forms part of the housing of the printing device 1. A cover 6 is mounted on the case 4 and can open and close an opening that communicates with the interior space of the case 4. A tray 5 for accommodating the printing media W is disposed inside the case 4. The tray 5 can be pulled out to the front of the case 4 for replenishing printing media W.

The tanks 12 store ink. The tanks 12 are exposed outside the case 4 when the cover 6 is open. The tanks 12 are connected to ejection heads 20 (see FIG. 2) via channels for supplying ink to the ejection heads 20.

Figure 2:
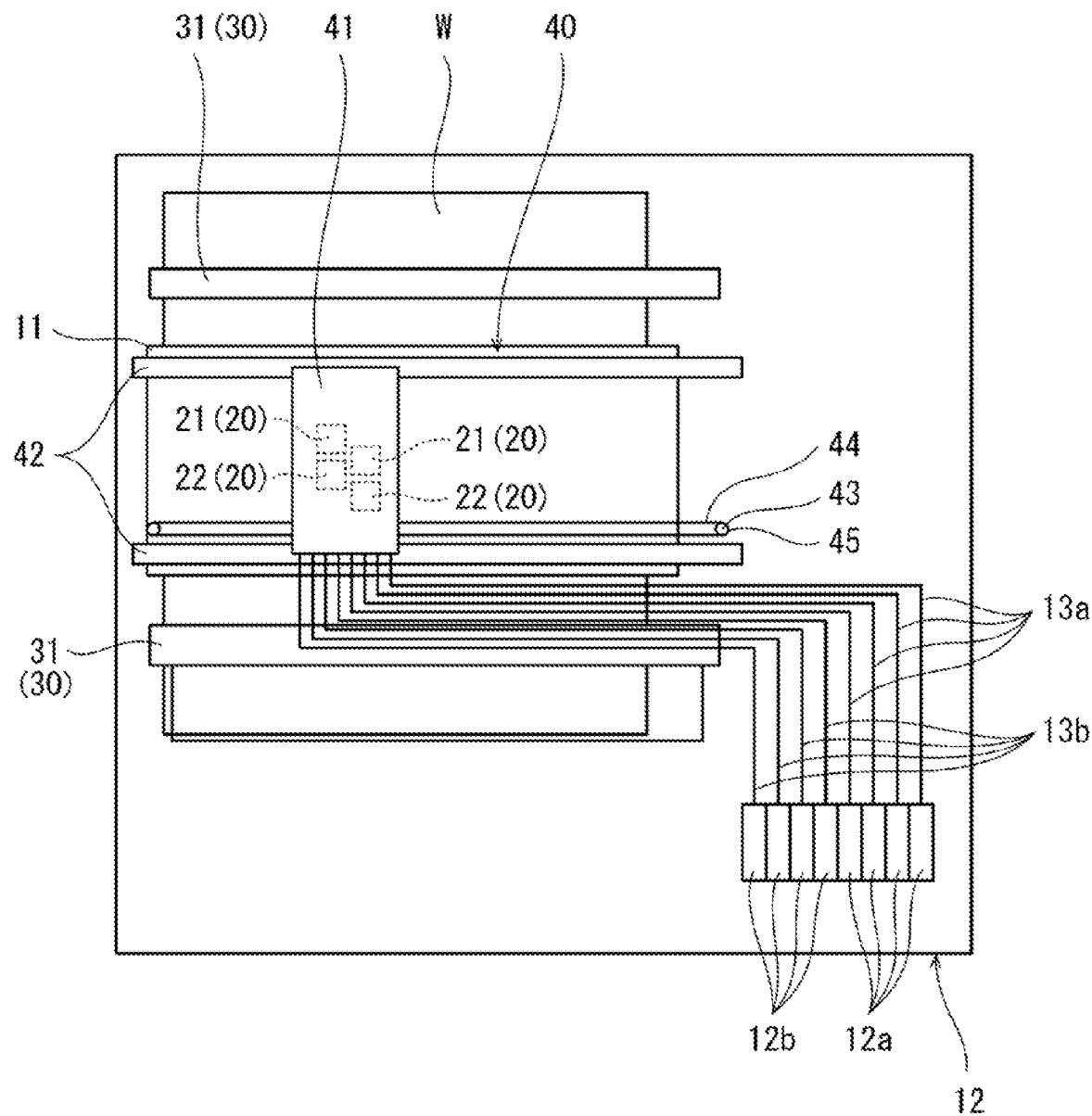
FIG. 2 is a plan view of the configuration of the printing device in FIG. 1, including ejection heads.

As shown in FIG. 2, the printing device 1 employs a serial head system and includes a plurality of ejection heads 20, a platen 11, a plurality of tanks 12, a conveying device 30, and a scanning device 40. However, the printing device 1 may employ a line head system. In this case, the scanning device 40 is omitted from the printing device 1, and the ejection heads 20 are immobile and have a length in the moving direction Ds that is greater than the printing area on the printing medium W.

The ejection heads 20 use ink in basic colors (described later) to print images on printing media W based on image data. The ejection heads 20 include two first ejection heads 21, and two second ejection heads 22, for example. The platen 11 has a flat top surface and defines the distance between a printing medium W placed on this top surface and the bottom surface of the ejection heads 20, which are disposed to face this top surface. The tanks 12 are containers for storing ink. The number of tanks 12 is equal to or greater than the number of ink types. For example, the tanks 12 include four first tanks 12a that respectively store ink in one of four basic colors, and one or a plurality of second tanks 12b that store ink in special colors. The ejection head 20 is an example of the printing engine.

Examples of basic color inks are cyan ink, yellow ink, magenta ink, and black ink. Special color inks have different colors from the basic colors. Examples of special color inks are red ink, green ink, and blue ink.

The first tanks 12a store ink in the basic colors and communicate with the first ejection heads 21 through first channels 13a. Ink in the basic colors is supplied from the first tanks 12a to the first ejection heads 21 via the first channels 13a. The second tanks 12b communicate with the second ejection heads 22 via second channels 13b. When the second tanks 12b store ink in special colors, the special color inks flow from the second tanks 12b into the second channels 13b, filling the second channels 13b. From the second channels 13b, the special color inks are supplied to the second ejection heads 22. Before ink in special colors is stored in the second tanks 12b, the second tanks 12b are filled with a storage solution, which is different from the special color inks. The first channels 13a and second channels 13b are rubber tubes or plastic tubes, for example, which are preferably resistant to kinking.

The conveying device 30 includes two pairs of conveying rollers 31, and a conveying motor 32 (see FIG. 3), for example. The two pairs of conveying rollers 31 are arranged in the conveying direction Df (front-rear direction) with the platen 11 interposed therebetween. The conveying rollers 31 have axes extending in the moving direction Ds. The two conveying rollers 31 in each pair are arranged in the up-down direction Dz and are configured to nip a printing medium W therebetween. One conveying roller 31 in each pair is connected to the conveying motor 32. The conveying rollers 31 rotate about their axes when driven by the conveying motor 32 and convey a printing medium W over the platen 11 in the conveying direction Df.

The scanning device 40 includes a carriage 41, two guide rails 42, a scanning motor 43, and an endless belt 44. The two guide rails 42 extend in the moving direction Ds above the platen 11 with the ejection heads 20 interposed therebetween in the conveying direction Df. The ejection heads 20 are mounted on the carriage 41. The carriage 41 is supported on the two guide rails 42 so as to be movable in the moving direction Ds. The endless belt 44 extends in the moving direction Ds and is attached to the carriage 41. The endless belt 44 is also connected to the scanning motor 43 via a pulley 45. When the scanning motor 43 is driven, the endless belt 44 circulates to reciprocate the carriage 41 in the moving direction Ds along the guide rails 42. In this way, the carriage 41 is configured to move the ejection heads 20 in the moving direction Ds. The carriage 41 is an example of the moving unit. The moving direction Ds is an example of the direction crossing the conveying direction.

Figure 3:
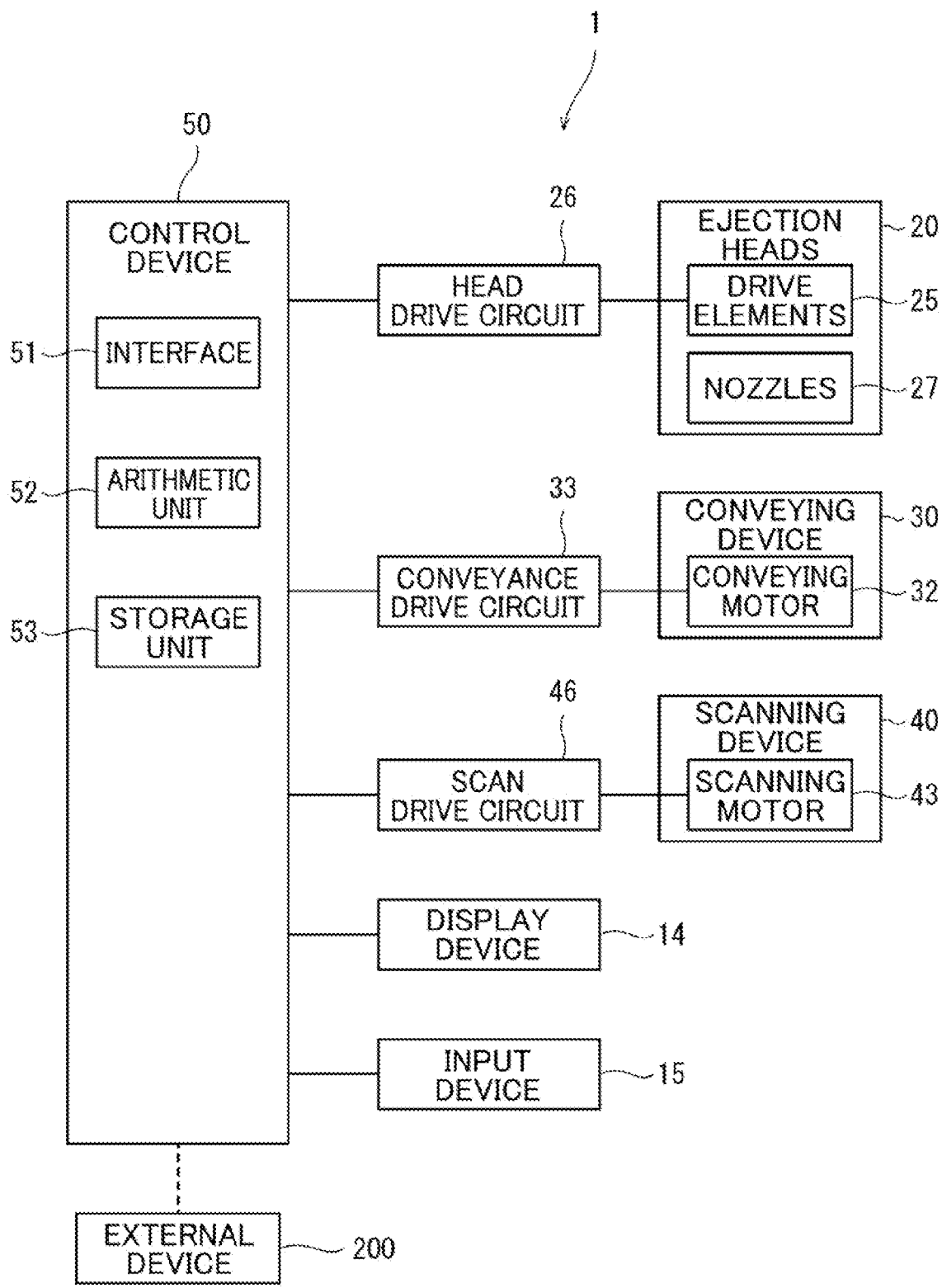
FIG. 3 is a block diagram of the configuration of the control system of the printing device in FIG. 1.

As illustrated in FIG. 3, each of the ejection heads 20 includes a plurality of drive elements 25. The drive elements 25 may be piezoelectric elements, heating elements, electrostatic actuators, and the like. The drive elements 25 are provided for respective nozzles 27 in the ejection head 20 and are configured to apply pressure to ink to eject the ink from the corresponding nozzles 27.

The printing device 1 further includes a display device 14, an input device 15, and a control device 50. The control device 50 is an example of the controller. The control device 50 includes an interface 51, an arithmetic unit 52, and a storage unit 53. The interface 51 is configured to receive image data and other various data from an external device 200. The external device 200 may be a computer, a camera, a communication network, a storage medium, a display, a printer, or the like. The image data is raster data and the like representing an image to be printed on the printing medium W. The image data includes information on printing conditions including the type of printing medium W and the like. The control device 50 may be configured as a standalone device, or a plurality of devices in a distributed arrangement. In the latter case, the devices operate the printing device 1 in cooperation with one another.

The storage unit 53 stores an overall patch image PA described later in advance. The overall patch image PA is an image including a plurality of patches P used for color calibration for printing images. The plurality of patches P includes a plurality of basic patches BP (described later) corresponding to the plurality of basic colors. The basic colors are example of a plurality of predetermined colors. The storage unit 53 also stores information on a plurality of printing characteristic areas CR in advance. The printing characteristic areas CR are areas in the overall patch image PA. The printing characteristic areas CR have different printing characteristics with respect to the reproducibility of printing colors. The overall patch image PA and printing characteristic areas CR will be described later in detail.

The storage unit 53 is memory that the arithmetic unit 52 can access. The storage unit 53 has RAM and ROM. The RAM temporarily stores various data, including data received from the external device 200, such as image data, and data converted by the arithmetic unit 52. The ROM stores a printing program, prescribed data, and the like for performing various data processes. As an alternative to the storage unit 53, the printing program may be stored in an external storage medium that is accessible by the arithmetic unit 52. For example, the printing program may be stored in a CD-ROM. The ROM is an example of the non-transitory computer-readable storage medium. The printing program is an example of the set of instructions.

The arithmetic unit 52 includes at least one of circuits, including a processor such as a Central Processing Unit (CPU), an integrated circuit such as an Application-Specific Integrated Circuit (ASIC), and the like. By executing the printing program, the arithmetic unit 52 controls the components of the printing device 1 to implement a printing operation and other various operations. In the present embodiment, the arithmetic unit 52 is also an example of the controller.

The display device 14 is a display, for example. In accordance with instructions from the control device 50, the display device 14 is configured to display images represented by image data, preview images PV described later, and the like. Note that the display device 14 may not be able to display images (uncalibrated images represented by image data) or preview images PV that are exactly the same as when printed on printing media W with the ejection heads 20. In this specification, the description "the display device 14 displays images represented by image data, and preview images PV" means not only that the display device 14 displays images and preview images PV that are exactly the same as when printed on printing media W with the ejection heads 20, but also that the display device 14 displays images and preview images PV that are substantially the same as when printed on printing media W with the ejection heads 20. The input device 15 is configured of buttons and the like, for example, that the user operates. Alternatively, the input device 15 may be a touchscreen integrated with the display device 14.

The control device 50 is electrically connected to the conveying motor 32 of the conveying device 30 via a conveyance drive circuit 33 for controlling the drive of the conveying motor 32. Accordingly, the control device 50 is configured to control conveyance of the printing medium W using the conveying device 30. The control device 50 is also electrically connected to the scanning motor 43 of the scanning device 40 via a scan drive circuit 46 for controlling the drive of the scanning motor 43. Accordingly, the control device 50 is configured to control movement of the ejection heads 20 using the scanning device 40. The control device 50 is further electrically connected to the drive elements 25 via a head drive circuit 26. The control device 50 is configured to output control signals for the drive elements 25 to the head drive circuit 26, and the head drive circuit 26 is configured to generate and output drive signals to the corresponding drive elements 25 based on these control signals. When driven according to the drive signals, the drive elements 25 eject ink from the corresponding nozzles 27.

In the printing device 1 having the above configuration, the control device 50 is configured to acquire image data and execute a printing operation based on this image data. At this time, the control device 50 controls the ejection heads 20 to eject ink onto the printing medium W therefrom while moving the ejection heads 20 in the moving direction Ds in a printing path. Next, the control device 50 conveys the printing medium W forward. The printing device 1 repeatedly alternates between a printing path and a conveying operation in this way to print an image on the printing medium W based on the image data.

Figure 4A:
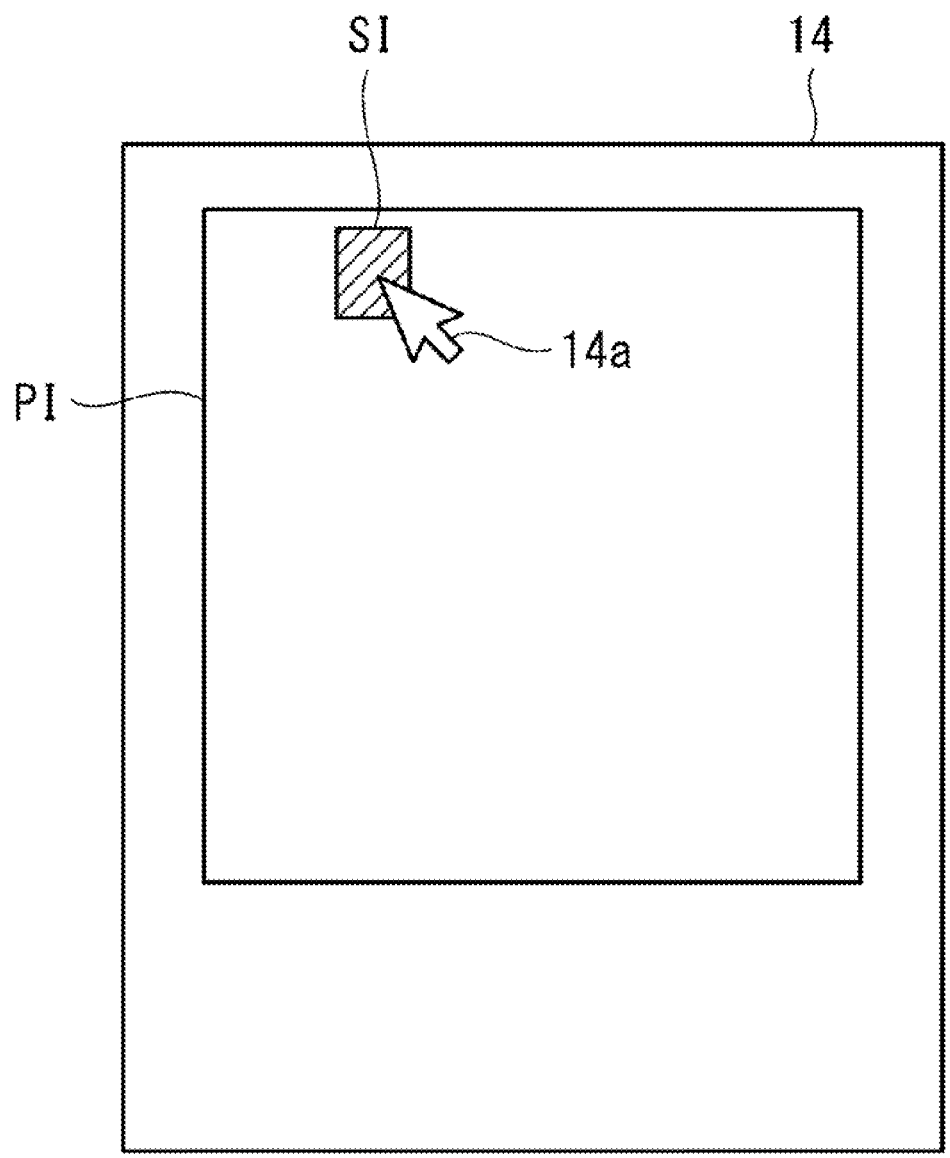
FIG. 4A illustrates an example of a specified image that a user has specified in a preview image of image data displayed on a display device.
Figure 4B:
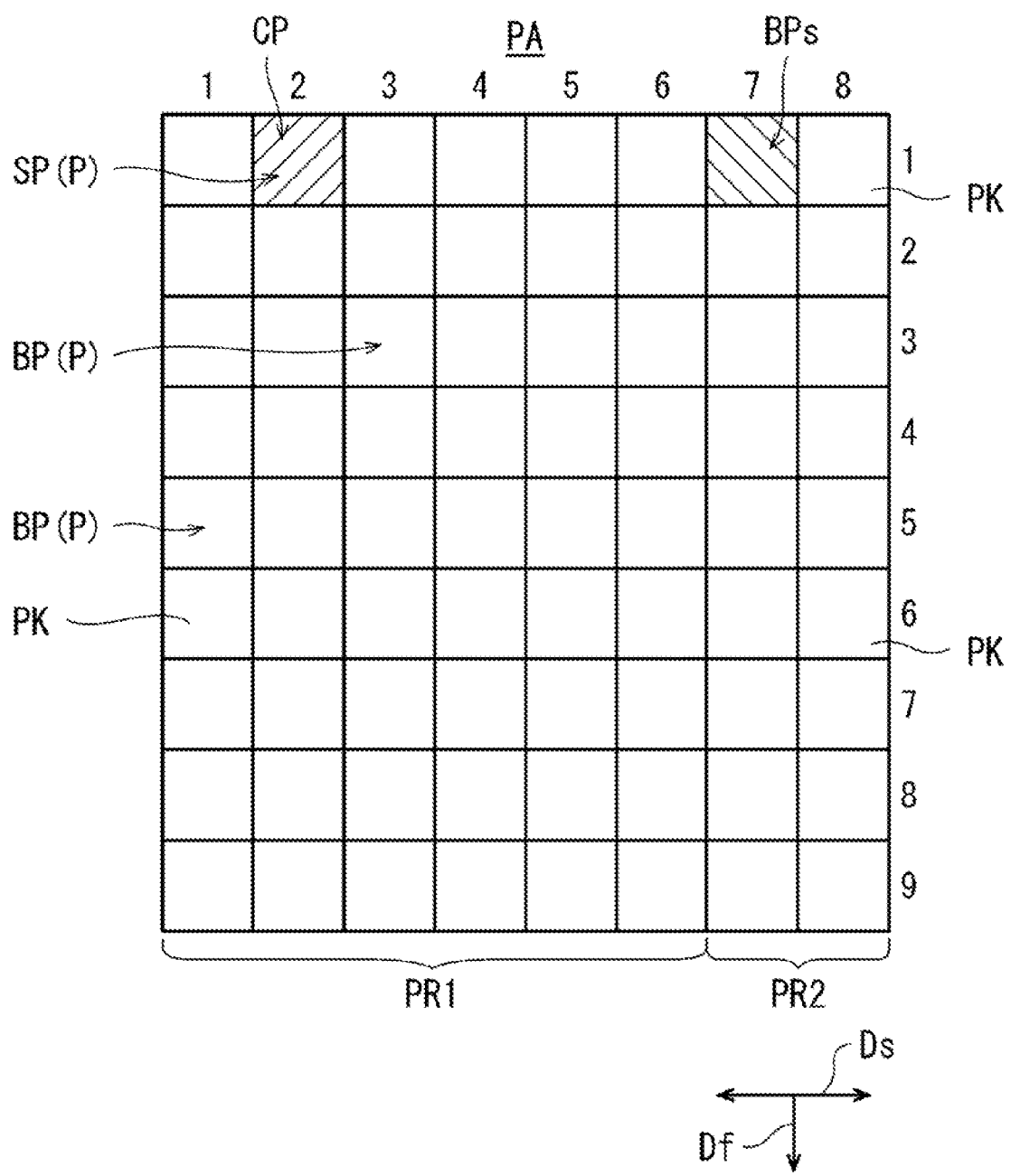
FIG. 4B illustrates the arrangement of a specified patch for the specified image of FIG. 4A in an overall patch image.

FIG. 4A shows a preview image PI displayed on the display device 14 based on image data, and an example of a specified image SI that the user has specified in the preview image PI. FIG. 4B shows the arrangement of a specified patch SP for the specified image SI in the overall patch image PA.

The control device 50 is configured to receive image data transmitted from the external device 200. The image data includes color values. For example, the color value is represented by an RGB value in the RGB color space, i.e., as color coordinates in a device-dependent color space. An RGB value is constituted by a red component value, a green component value, and a blue component value, each of which represents one of a possible 256 gradations ranging from 0 to 255. The RGB value expresses a single color by the combination of these three component values.

As shown in FIG. 4A, the control device 50 is configured to display a preview image PI based on image data on the display device 14. When the preview image PI is displayed on the display device 14, the user specifies, as the specified image SI, an image (one or more pixels) in the preview image PI. Specifically, the user specifies an image having one or more colors for which the user wishes to create one or more patches P. In this case, the specified image SI specified by the user is indicated by a pointer 14a in the display device 14. For simplicity, portions of the image other than the specified image SI have been omitted from the drawing in FIG. 4A, and such portions will be omitted from similar drawings hereafter.

The control device 50 is configured to generate a specified patch SP. The specified patch SP is a patch for the color that the user has specified in the preview image PI. Specifically, to generate the specified patch SP, the control device 50 generates raster data that includes the ink color, droplet size, and ejection order (arrangement) of ink droplets for forming a patch P that is the specified patch SP. In the present embodiment, the patch P is a patch image having a prescribed shape and a prescribed area.

As shown in FIG. 4B, the overall patch image PA includes a first patch area PR1, and a second patch area PR2 different from the first patch area PR1. The first patch area PR1 is an area in which the basic patches BP are arranged. The second patch area PR2 constitutes a margin area adjacent to the first patch area PR1 in the moving direction Ds. Each of the first patch area PR1 and second patch area PR2 has a plurality of patch cells PK (i.e., a plurality of patch sections). Each patch cell PK is a compartment having a predetermined area for arranging a patch P to be printed. Here, the basic patches BP are patches P for the plurality of basic colors in the image data and are arranged in the patch cells PK predetermined for the plurality of basic colors. The basic patch BP is arranged in each of the patch cells PK in the first patch area PR1, i.e., each patch cell PK in the first patch area PR1 has one basic patch BP arranged therein. To facilitate understanding, the following description will identify the position of each patch cell PK using its row and column positions (e.g., using the position in a matrix consisting of nine rows and eight columns in FIG. 4B).

In a process for printing the overall patch image PA, the control device 50 is configured to control the ejection heads 20 to print at least one specified patch SP in the first patch area PR1 and to print at least one basic patch BP in the second patch area PR2. Specifically, prior to performing the process to print the overall patch image PA, the control device 50 is configured to arrange the specified patch SP at a corresponding position CP in the overall patch image PA. The corresponding position is a position in the overall patch image PA that corresponds to the position of the user-specified color (the specified image SI) in the preview image PI, as illustrated in FIG. 4B.

Here, the corresponding position CP is a position in the first patch area PR1 of the overall patch image PA that is determined based on the position of the specified image SI in the preview image PI. More specifically, the corresponding position CP is the patch cell PK that is determined based on the position of the specified image SI (the specified color) in the preview image PI or based on the position of the specified image SI (the specified color) in the image represented by the image data. Based on the assumption that the preview image PI and overall patch image PA have similar shapes, the corresponding position CP is the position in the overall patch image PA at which a first distance ratio and a second distance ratio are fixed values that are the same value as each other. The first distance ratio is the ratio of the distance in the conveying direction Df between the specified image SI and a predetermined point of origin in the preview image PI to the distance in the conveying direction Df between the position and a predetermined point of origin in the overall patch image PA. The second distance ratio is the ratio of the distance in the moving direction Ds between the specified image SI and the predetermined point of origin in the preview image PI to the distance in the moving direction Ds between the position and the predetermined point of origin in the overall patch image PA.

For arranging the specified patch SP at the corresponding position CP, the control device 50 is configured to first determine whether the corresponding position CP falls within the first patch area PR1. When the corresponding position CP falls within the first patch area PR1, the control device 50 moves (rearranges) the basic patch BP currently arranged at the corresponding position CP to a vacant patch cell PK in the second patch area PR2 prior to arranging the specified patch SP at the corresponding position CP. The basic patch arranged in the vacant patch cell PK is indicated by "BPs" in FIG. 4B. After moving the basic patch BPs to the vacant patch cell PK, the control device 50 arranges the specified patch SP at the corresponding position CP in the first patch area PR1. In this way, the specified patch SP is arranged at the corresponding position CP. Note that when the corresponding position CP is not within the first patch area PR1, the control device 50 may perform a process to arrange the specified patch SP in a patch cell PK of the second patch area PR2 or the like.

Figure 5B:
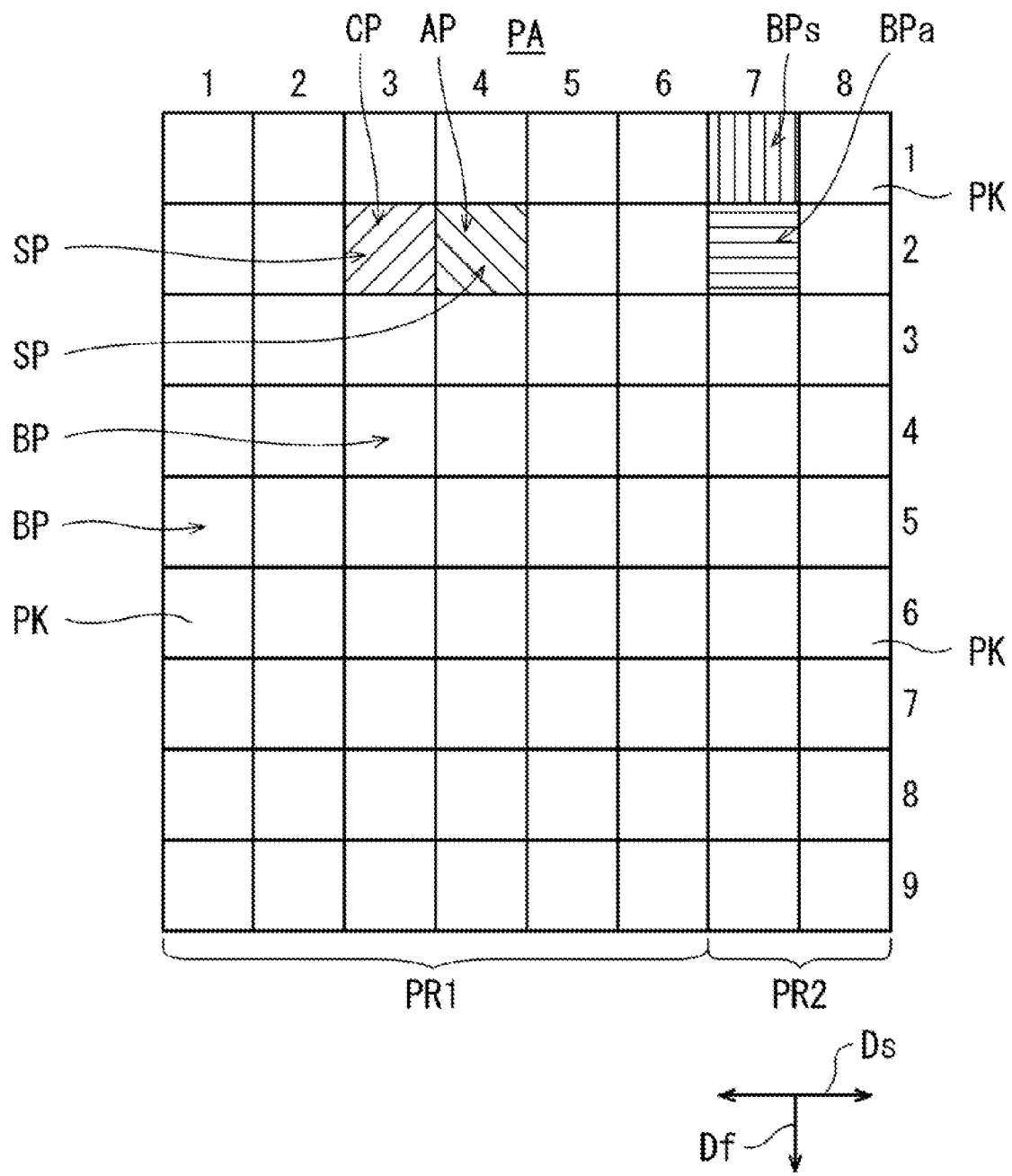
FIG. 5B illustrates the arrangement of specified patches for the specified image of FIG. 5A in an overall patch image.

FIG. 5A shows another example of a specified image SI that the user has specified in the preview image PI displayed on the display device 14. FIG. 5B shows the arrangement of a plurality of specified patches SP for the specified image SI in the overall patch image PA.

The specified image SI specified by the user may include a plurality of colors. In other words, the user may specify a plurality of colors. In the example depicted in FIG. 5A, the specified image SI illustrated has two colors, which are illustrated with different hatching to differentiate the two colors.

When the user has specified a plurality of colors and the corresponding position CP for each color falls in the same patch cell PK of the overall patch image PA, the control device 50 executes the following process. The control device 50 arranges, at the corresponding position CP, the specified patch SP for one color among the plurality of user-specified colors excluding the color having the lowest predetermined priority among the plurality of user-specified colors. In other words, the control device 50 arranges, at the corresponding position CP, the specified patch SP for one color whose predetermined priority is not the lowest among the plurality of colors specified by the user. In the present embodiment, the control device 50 arranges, at the corresponding position CP, the specified patch SP for the color whose predetermined priority is the highest among the user-specified colors. Next, the control device 50 arranges the specified patches SP for the remaining user-specified colors at adjacent positions AP adjacent to the corresponding position CP. In other words, no patches of other colors are positioned between the specified patch SP for the color having the highest predetermined priority and the specified patches SP for the remaining specified colors.

In a case where the user has specified two colors and the corresponding position CP for each of the two user-specified colors falls in the same patch cell PK as shown in FIG. 5B, the specified patch SP for one of the two user-specified colors whose predetermined priority is higher is arranged at the corresponding position CP, whereas the specified patch SP for the other of the two user-specified colors at an adjacent position AP adjacent to the corresponding position CP.

The predetermined priority may be set based on the sizes of the areas of the colors within the specified image SI or based on the order in which the user specified the plurality of colors. Further, the adjacent position AP only need to be the position of any patch cell PK adjacent to the patch cell PK associated with the corresponding position CP, such as the position of a patch cell PK that is adjacent to the corresponding position CP in the conveying direction Df. Here, it is preferable that the arrangement of the specified patch SP for the color having the higher predetermined priority and the specified patch SP for the remaining color is based on the fact that the parts of the specified image SI corresponding to the two colors are arranged side by side in the moving direction Ds in FIG. 5A. In this case, the adjacent position AP is preferably positioned next to the corresponding position CP in the moving direction Ds.

Before executing the process to arrange one specified patch SP at the corresponding position CP and the other specified patch SP at the adjacent position AP as described above, the control device 50 moves the basic patch BP currently (i.e., originally) arranged at the corresponding position CP to a vacant patch cell PK in the second patch area PR2 as the basic patch BPs prior to arranging the one specified patch SP at the corresponding position CP. Additionally, before executing the process to arrange one specified patch SP at the corresponding position CP and the other specified patch SP at the adjacent position AP as described above, the control device 50 moves the basic patch BP currently arranged at the adjacent position AP to another vacant patch cell PK in the second patch area PR2 as a basic patch BPa prior to arranging the other specified patch SP at the adjacent position AP.

Figure 6B:
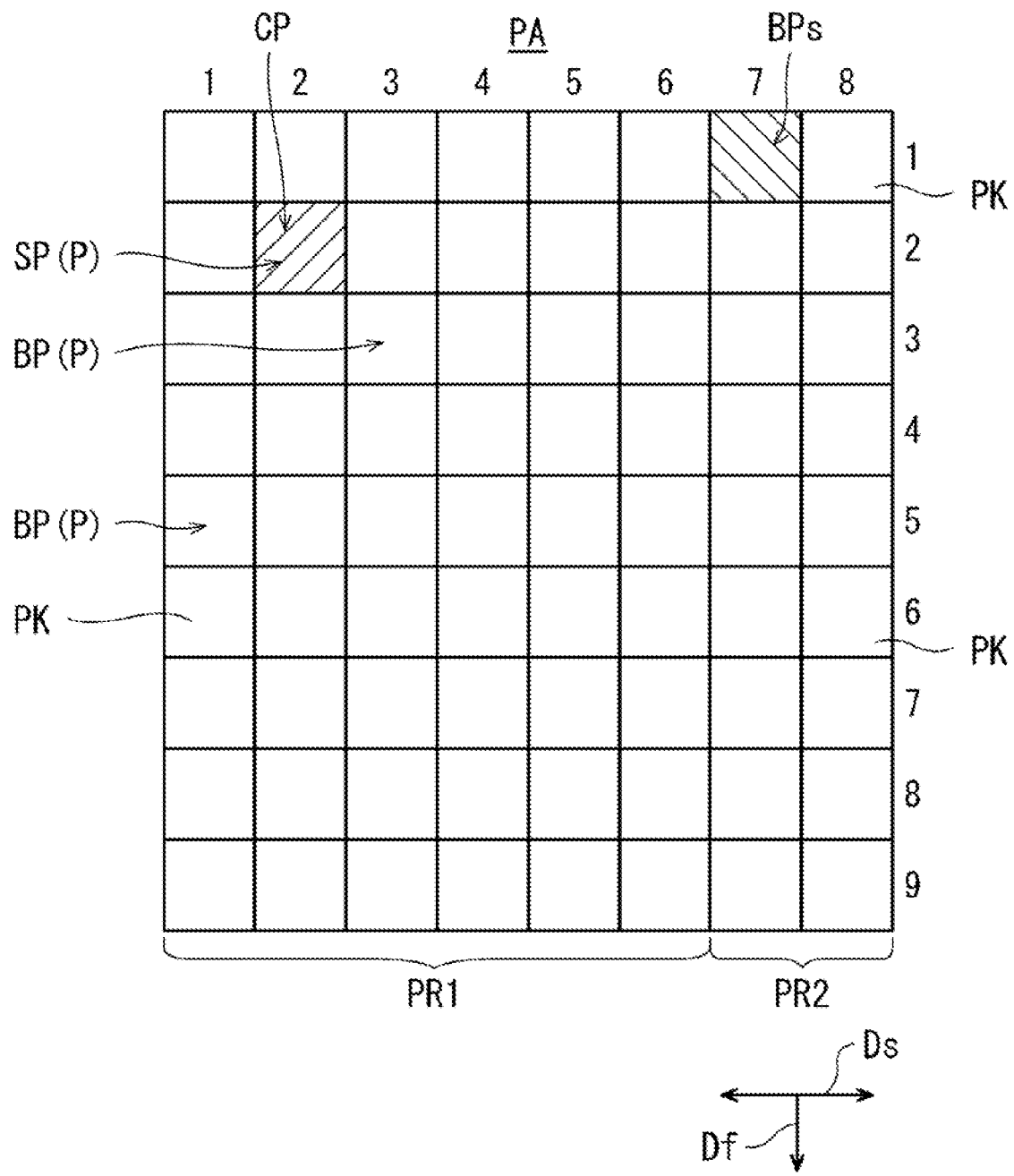
FIG. 6B illustrates the arrangement of a specified patch for the specified image of FIG. 6A in an overall patch image.
Figure 7:
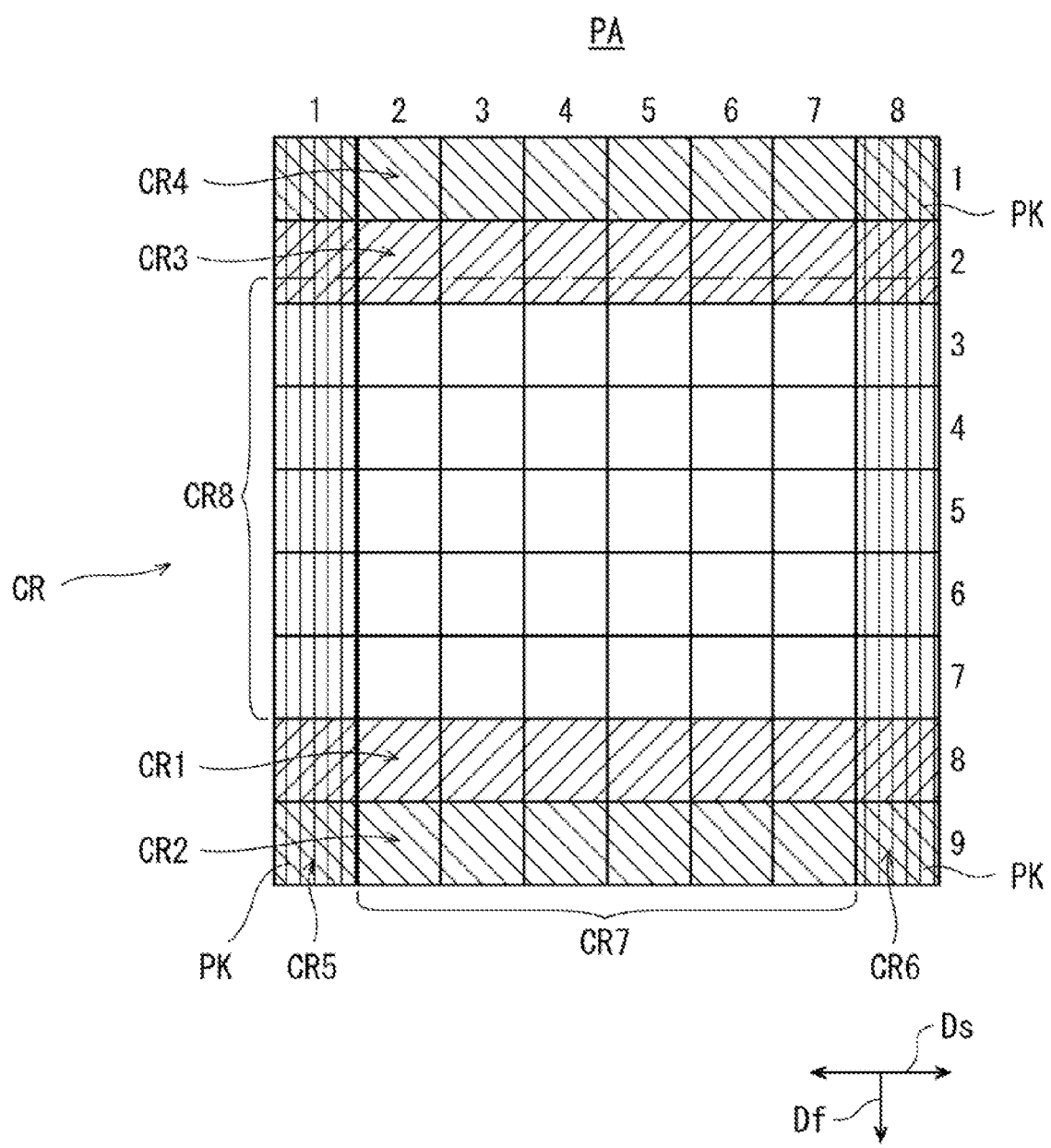
FIG. 7 illustrates a plurality of printing characteristic areas in the overall patch image.

FIG. 6A shows another example of a specified image SI that the user specified in the preview image PI based on image data displayed on the display device 14. FIG. 6B shows the arrangement in the overall patch image PA of the specified patch SP corresponding to the specified image SI in FIG. 6A. FIG. 7 shows a plurality of printing characteristic areas CR in the overall patch image PA.

Figure 8:
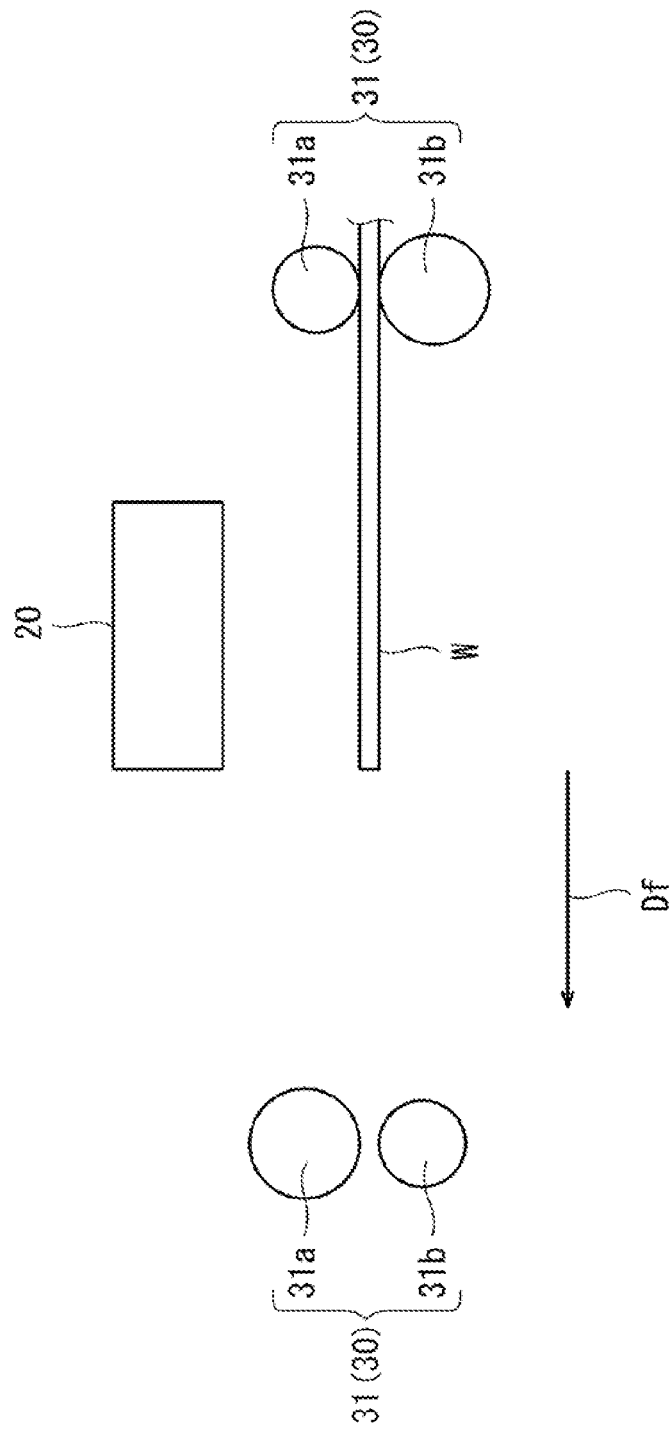
FIG. 8 illustrates a printing medium being conveyed while nipped only by upstream conveying rollers.
Figure 9:
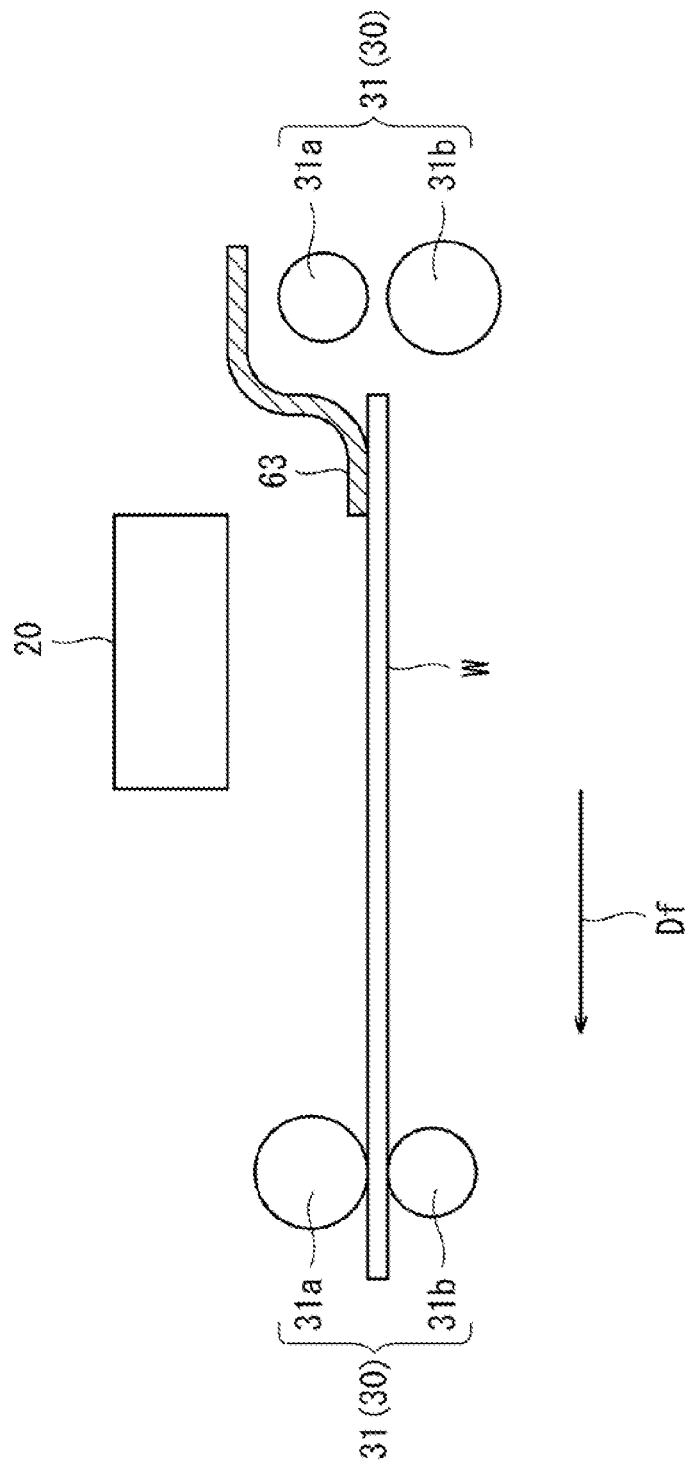
FIG. 9 illustrates the printing medium being held down by a holding member and being conveyed while nipped only by downstream conveying rollers.
Figure 10:
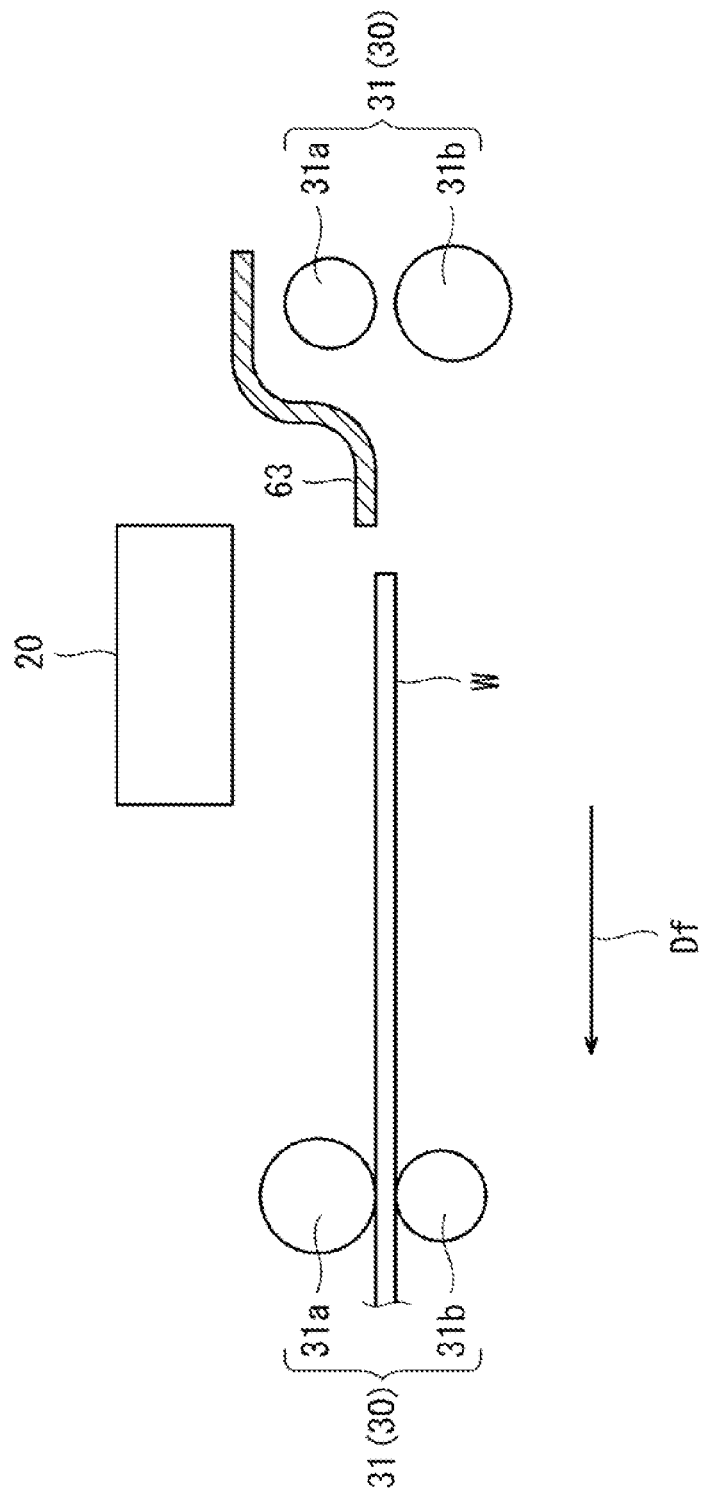
FIG. 10 illustrates the printing medium being conveyed only by the downstream conveying rollers without being held down by the holding member.

FIG. 8 shows a printing medium W being conveyed while nipped only by the upstream conveying rollers 31. FIG. 9 shows the printing medium W being held down from above by a holding member 63 and being conveyed while nipped only by the downstream conveying rollers 31. FIG. 10 shows a printing medium W being conveyed only by the downstream conveying rollers 31 while no longer being held down by the holding member 63. The upstream conveying rollers 31 are each an example of the first conveying unit. The downstream conveying rollers 31 are each an example of the second conveying unit.

The control device 50 may arrange the specified patch SP based on whether the position (i.e., the corresponding position CP) in the overall patch image PA corresponding to the position of the specified image SI belongs to two or more of the printing characteristic areas CR, which are areas in the overall patch image PA having different printing characteristics with respect to the reproducibility of printing colors. The printing characteristic areas CR will be described next.

As shown in FIG. 7, the printing characteristic areas CR include printing characteristic areas CR1-CR8 in this example. The sizes and positions of these printing characteristic areas CR1-CR8 are merely one example. The control device 50 determines which of the printing characteristic areas CR1-CR8 the corresponding position CP belongs to.

The printing characteristic area CR1 is located on the downstream side of the overall patch image PA in the conveying direction Df, and the printing characteristic area CR2 is located farther downstream in the overall patch image PA from the printing characteristic area CR1 in the conveying direction Df. In the example of FIG. 7, the printing characteristic area CR1 is an area that includes patch cells PK belonging to every column (the first through eighth columns) in the eighth row, and the printing characteristic area CR2 is an area that includes patch cells PK belonging to every column (the first through eighth columns) in the ninth row.

As illustrated in FIG. 8, the conveying device 30 includes the pair of conveying rollers 31 positioned on the upstream side in the conveying direction Df and the pair of conveying rollers 31 positioned on the downstream side in the conveying direction Df. The pairs of conveying rollers 31 positioned on the upstream and downstream sides each includes an upper roller 31a and a lower roller 31b positioned below the corresponding upper roller 31a. The printing medium W is nipped between the upper rollers 31a and the corresponding lower rollers 31b when conveyed.

The printing characteristic area CR1 is an area in which printing is performed on the printing medium W by the ejection heads 20 (i.e., one or more specified patches SP and/or other images are printed on the printing medium W by the ejection heads 20) while the printing medium W is conveyed by the upstream conveying rollers 31 without being conveyed by the downstream conveying rollers 31, as illustrated in FIG. 8. The printing characteristic area CR1 is also an area that is printed in a first printing mode described next.

The control device 50 is configured to switch the printing mode implemented by the ejection heads 20 between the first printing mode and a second printing mode different from the first printing mode. In the first printing mode, the ejection heads 20 print by ejecting ink droplets from a first number of nozzles 27 arranged consecutively in the conveying direction Df while the carriage 41 moves the ejection heads 20 in the moving direction Ds. In the second printing mode, the ejection heads 20 execute printing by ejecting droplets from a second number of nozzles 27 arranged consecutively in the conveying direction Df while the carriage 41 moves the ejection heads 20 in the moving direction Ds. The second number is larger than the first number. In other words, the first printing mode and second printing mode differ in the number of consecutive nozzles 27 in the conveying direction Df that are used, i.e., the printing width in the conveying direction Df.

The printing characteristic area CR2 is identical to the printing characteristic area CR1 in that printing is performed (e.g., one or more specified patches SP are printed on the printing medium W) while the printing medium W is conveyed by the upstream conveying rollers 31 without being conveyed by the downstream conveying rollers 31. However, the printing characteristic area CR2 differs from the printing characteristic area CR1 in that the printing characteristic area CR2 is an area printed in the second printing mode.

The printing characteristic area CR3 is located on the upstream side of the overall patch image PA in the conveying direction Df, and the printing characteristic area CR4 is located farther upstream in the overall patch image PA from the printing characteristic area CR3 in the conveying direction Df. The printing characteristic area CR3 in FIG. 7 is an area that includes patch cells PK belonging to every column (the first through eighth columns) in the second row, and the printing characteristic area CR4 is an area including patch cells PK in every column (the first through eighth columns) in the first row.

As shown in FIG. 9, the printing device 1 includes the holding member 63 for holding down the printing medium W in the vertical direction. The holding member 63 is positioned between the ejection heads 20 and the upstream conveying rollers 31 in the conveying direction Df.

As shown in FIG. 9, the printing characteristic area CR3 is an area in which printing is performed on the printing medium W by the ejection heads 20 (i.e., one or more specified patches SP and/or other images are printed on the printing medium W by the ejection heads 20) while the printing medium W is conveyed by the downstream conveying rollers 31 and held down by the holding member 63 without being conveyed by the upstream conveying rollers 31.

As shown in FIG. 10, the printing characteristic area CR4 is an area in which printing is performed on the printing medium W by the ejection heads 20 (i.e., one or more specified patches SP and/or other images are printed on the printing medium W by the ejection heads 20) while the printing medium W is conveyed by the downstream conveying rollers 31 without being held down by the holding member 63 and without being conveyed by the upstream conveying rollers 31.

The printing characteristic area CR5 is an acceleration area in which the carriage 41 moves while accelerating. The printing characteristic area CR5 in FIG. 7 includes patch cells PK belonging to every row (first through ninth rows) in the first column. The printing characteristic area CR6 is a deceleration area in which the carriage 41 moves while decelerating. The printing characteristic area CR6 in FIG. 7 includes patch cells PK belonging to every row (first through ninth rows) in the eighth column. The printing characteristic area CR7 is a constant speed area in which the carriage 41 moves at a constant speed. The printing characteristic area CR7 in FIG. 7 includes all patch cells PK in the overall patch image PA excluding those in the printing characteristic areas CR5 and CR6. The printing characteristic area CR8 is an area in which printing is performed on the printing medium W by the ejection heads 20 (i.e., one or more specified patches SP and/or other images are printed on the printing medium W by the ejection heads 20) while the printing medium W is conveyed by both the upstream and downstream conveying rollers 31 and is held down by the holding member 63. Accordingly, the printing characteristic area CR8 is an area (a stable area) in which printing can be stably performed while the printing medium W is in a stable state.

The printing characteristic area CR8 in FIG. 7 includes all patch cells PK of the overall patch image PA excluding patch cells PK in the printing characteristic areas CR1, CR2, CR4, and a portion of the printing characteristic area CR3. Hence, in the example of FIG. 7, a portion of the printing characteristic area CR3 overlaps a portion of the printing characteristic area CR8 in the conveying direction Df. The printing characteristic areas CR1-CR8 described above are defined in the corresponding positions of the overall patch image PA.

As described above, the control device 50 determines whether the position in the overall patch image PA corresponding to the position of the user-specified image SI (user-specified color) in the image data belongs to two or more of the printing characteristic areas CR. When the position belongs to two or more of the printing characteristic areas CR, the control device 50 determines whether this position spans across two or more of the printing characteristic areas CR. In other words, when the position belongs to two or more of the printing characteristic areas CR, the control device 50 determines whether the two or more printing characteristic areas CR to which the position belongs include two or more adjacent printing characteristic areas CR. Note that the position of the specified image SI in the image data signifies the position of the specified image SI in the image represented by the image data.

Here, it will be assumed that the position in the overall patch image PA of FIG. 6B corresponding to the position of the specified image SI in FIG. 6A spans across both the printing characteristic area CR3 and printing characteristic area CR8. In this case, the control device 50 sets the corresponding position CP for the specified patch SP to the patch cell PK that spans across both the printing characteristic area CR3 and printing characteristic area CR8. That is, in this case, the patch cell PK spanning across both the printing characteristic areas CR3 and CR8 is set as the corresponding position CP for the specified patch SP. Note that printing characteristic areas CR across which the above position may span are not limited to the printing characteristic area CR3 and printing characteristic area CR8 but may be a plurality of other adjacent printing characteristic areas CR. The patch cell PK spanning across both the printing characteristic areas CR3 and CR8 is an example of the position spanning across the two or more of the printing characteristic areas across which the specific position spans.

Figure 11:
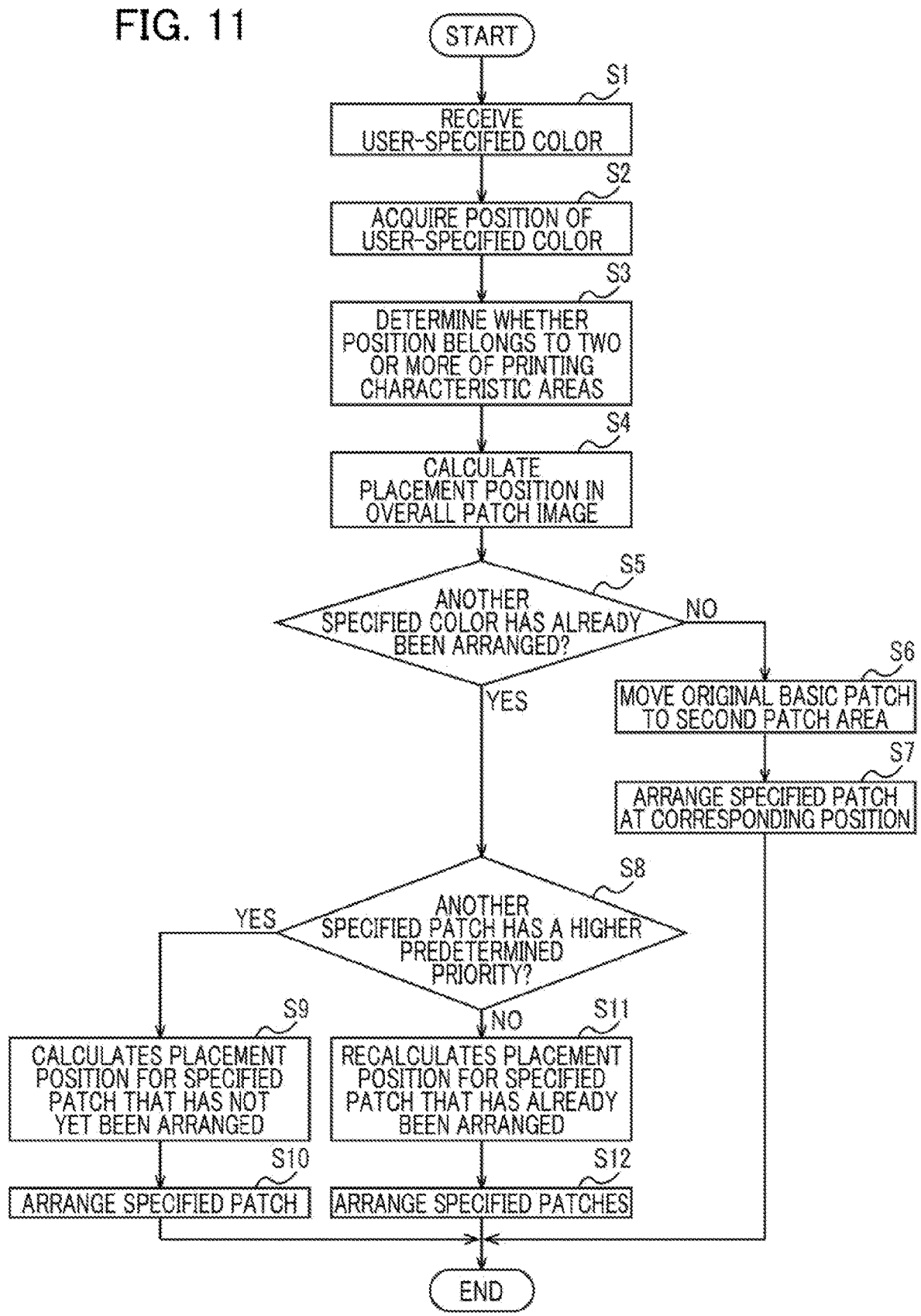
FIG. 11 is a flowchart illustrating an example of a method of arranging one or more specified patches for a specified image.

FIG. 11 is a flowchart showing steps in an example of a method executed by the control device 50 for arranging one or more specified patches SP corresponding to a specified image SI.

In S1 of FIG. 11, the control device 50 displays a preview image PI of image data on the display device 14 and receives a specified image SI specified by the user (one or more user-specified colors). In S2 the control device 50 acquires the position in the overall patch image PA corresponding to the position of the specified image SI. In S3 the control device 50 performs a process to determine whether the position acquired in S2 belongs to two or more of the printing characteristic areas CR. In other words, in S3 the control device 50 determines which of the printing characteristic areas CR the position acquired in S2 belongs to.

In S4 the control device 50 calculates, on the basis of the position acquired in S2 and the determination made in S3, the corresponding position CP in the overall patch image PA for a specified patch SP corresponding to the specified image SI. For example, when the position in the overall patch image PA corresponding to the specified position (the position of the specified image SI) spans across two or more of the printing characteristic areas CR, as described above, the corresponding position CP is set to a patch cell PK that spans across the two or more of the printing characteristic areas CR.

In S5 the control device 50 determines whether another specified color already exists, i.e., whether a specified patch SP for another specified color (e.g., a specified color previously specified by the user) has already been arranged at the corresponding position CP calculated in S4 for the current specified patch SP. When the user has not specified another color, i.e., when a specified patch SP for another specified color (e.g., a preceding specified color) has not been arranged at the corresponding position CP calculated in S4 for the current specified patch SP (S5: NO), in S6 the control device 50 moves the basic patch BP originally arranged at the corresponding position CP where the current specified patch SP is to be arranged at a patch cell PK in the second patch area PR2. In S7, the control device 50 arranges the current specified patch SP at the corresponding position CP.

However, when a preceding specified patch SP (a specified patch SP for another specified color) has already been arranged (S5: YES), in S8 the control device 50 determines whether the preceding specified patch SP has a higher predetermined priority (e.g., priority based on area) than the current specified patch SP that has not yet been arranged and is being arranged. When the priority of the preceding specified patch SP is higher (S8: YES), in S9 the control device 50 calculates a placement position for the current specified patch SP that has not yet been arranged. In S10 the control device 50 arranges the current specified patch SP at the placement position calculated in S9.

However, when the priority of the preceding specified patch SP is lower (S8: NO), in S11 the control device 50 recalculates a placement position for the preceding specified patch SP and in S12 moves the preceding specified patch SP to the recalculated position and arranges the current specified patch SP at the position just vacated by the preceding specified patch SP. Subsequently, the control device 50 controls the ejection heads 20 to print the overall patch image PA having the specified patches SP arranged therein on a printing medium W. Next, the control device 50 uses a colorimeter such as a spectrophotometer to measure colors in the overall patch image PA printed on the printing medium W and stores these colorimetric values in the storage unit 53 in association with the color values of the patches P. Next, the control device 50 creates a calibration profile based on these correlations for calibrating colors in the image being printed to target colors and controls the ejection heads 20 to print the image on the printing medium W based on this calibration profile.

Figure 12A:
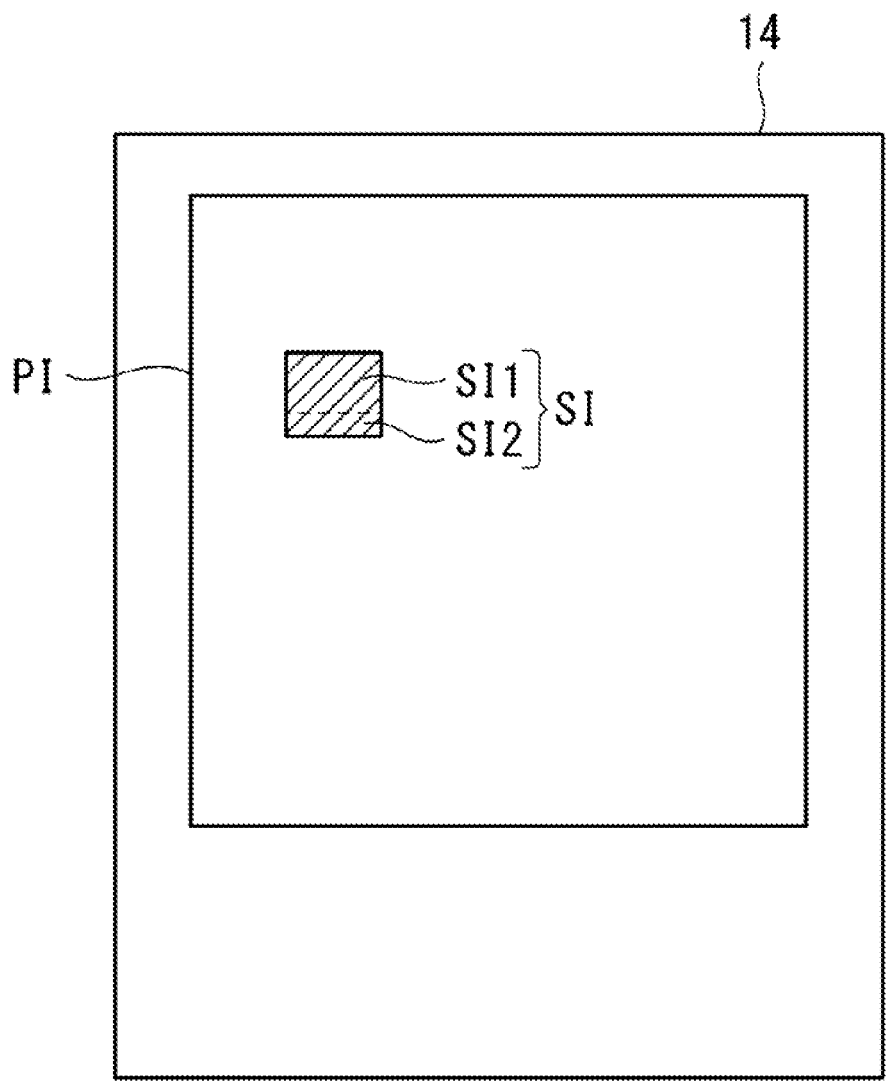
FIG. 12A illustrates another example of a specified image that a user has specified in a preview image of image data displayed on the display device.
Figure 12B:
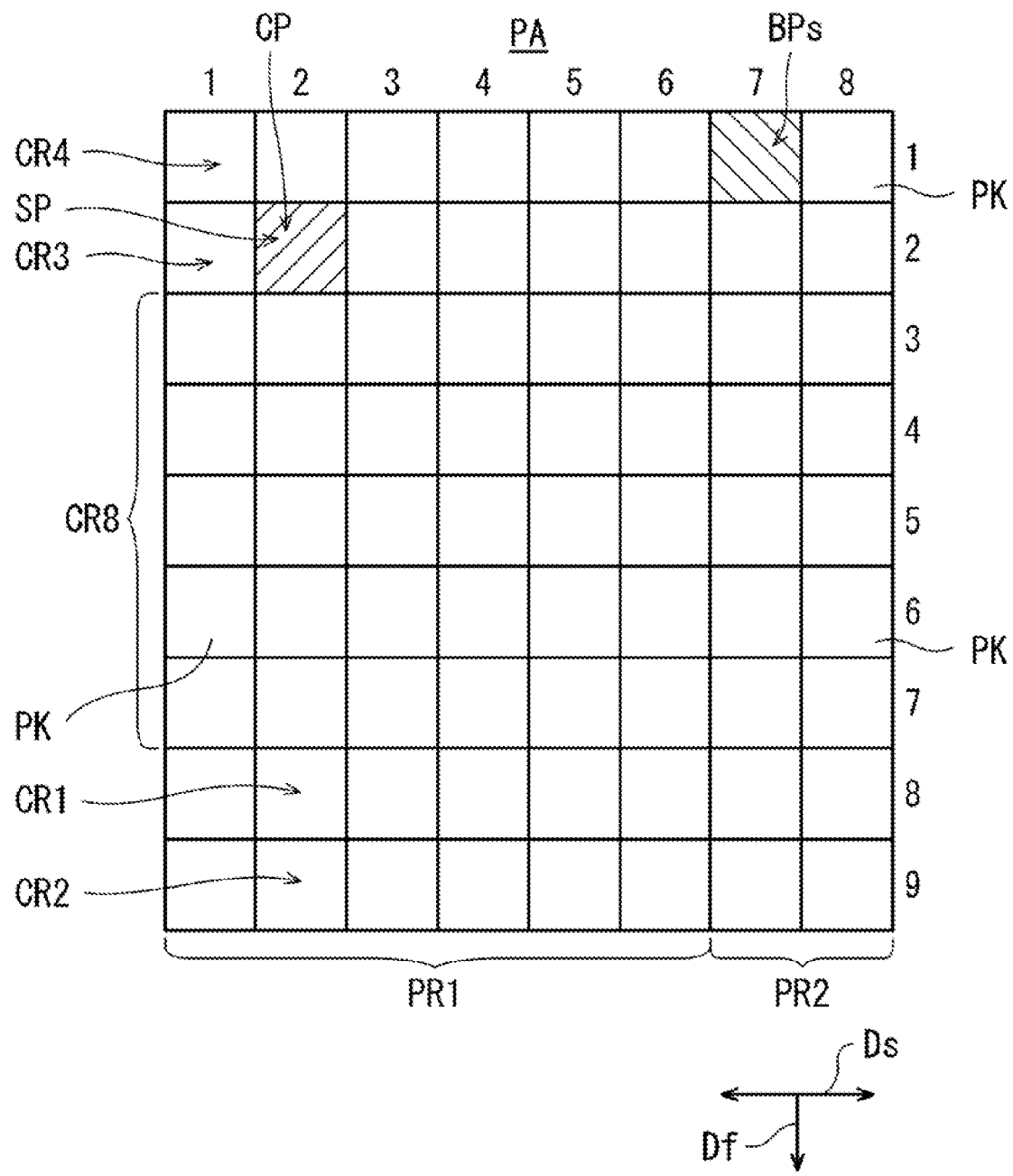
FIG. 12B illustrates the arrangement of a specified patch for the specified image of FIG. 12A in an overall patch image.
Figure 13:
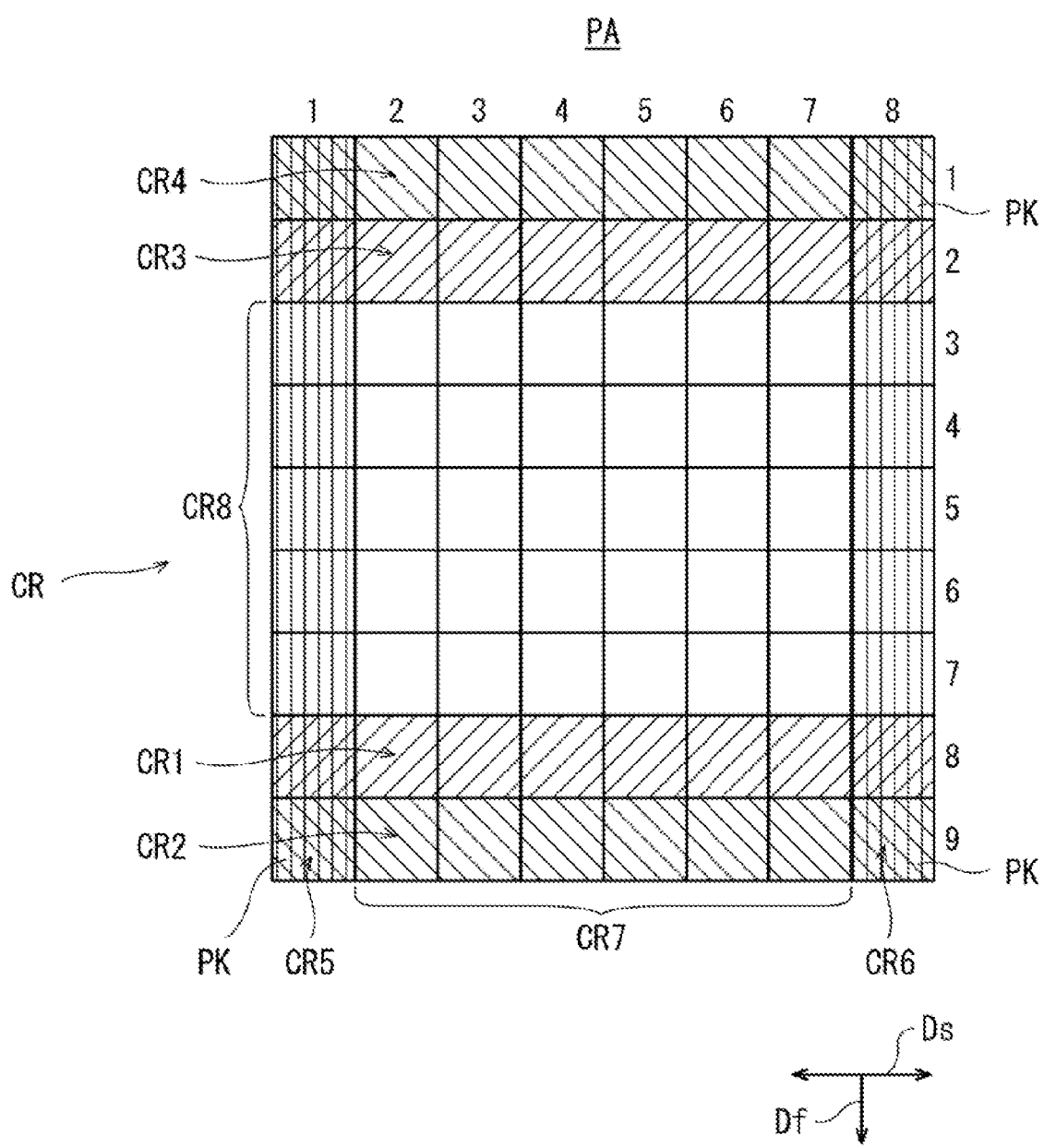
FIG. 13 illustrates another example of the plurality of printing characteristic areas in the overall patch image.

FIG. 12A shows another example of a specified image SI that the user has specified in a preview image PI of image data displayed on the display device 14. FIG. 12B shows the arrangement in the overall patch image PA of a specified patch SP corresponding to the specified image SI in FIG. 12A. FIG. 13 shows another example of a plurality of printing characteristic areas CR in the overall patch image PA. Note that the printing characteristic areas CR in FIG. 13 are identical to those in FIG. 7 except that the printing characteristic area CR3 and printing characteristic area CR8 do not overlap in the conveying direction Df.

As in the example of FIG. 6A, the control device 50 determines whether the position in the overall patch image PA corresponding to the position of the specified image SI in the image data (i.e., the position in the overall patch image PA corresponding to the position of the specified image SI in the image represented by the image data) belongs to two or more of the plurality of printing characteristic areas CR.

Further, when the position belongs to two or more of the plurality of printing characteristic areas CR, the control device 50 sets the corresponding position CP for a specified patch SP corresponding to the specified image SI to a patch cell PK belonging to one printing characteristic area CR of the two or more printing characteristic areas CR (i.e., one printing characteristic area CR of the two or more of the plurality of printing characteristic areas CR to which the position belongs) excluding the printing characteristic area CR whose color area in the image data is the smallest among the two or more printing characteristic areas CR. In other words, the control device 50 sets the corresponding position CP for a specified patch SP corresponding to the specified image SI to a patch cell PK belonging to one printing characteristic area CR whose color area is not the smallest among the two or more printing characteristic areas CR to which the position belongs. In the present embodiment, the control device 50 sets the corresponding position CP for a specified patch SP corresponding to the specified image SI to a patch cell PK belonging to the printing characteristic area CR whose color area is the largest among the two or more printing characteristic areas CR. The color area of the printing characteristic area CR in the image data is the portion of the printing characteristic area CR to which the specified color belongs in the image represented by the image data, i.e., the portion of the printing characteristic area CR to which the specified image SI belongs in the image represented by the image data. The position in the overall patch image PA corresponding to the position of the specified image SI (i.e., the specified color) in the image data is an example of the specific position.

As a specific example, assume that the position in the overall patch image PA corresponding to the position of the specified image SI in the image data of FIG. 12A belongs to both the printing characteristic area CR3 and the printing characteristic area CR8. In FIG. 12A, SI1 denotes the portion of the specified image SI belonging to the printing characteristic area CR3 while SI2 denotes the portion of the specified image SI belonging to the printing characteristic area CR8. In other words, SI1 denotes the color area of the printing characteristic area CR3 (i.e., the portion of the printing characteristic area CR3 to which the specified image SI belongs to) while SI2 denotes the color area of the printing characteristic area CR8 (i.e., the portion of the printing characteristic area CR8 to which the specified image SI belongs to). The area of the portion SI1 (the region in image data) is larger than the area of the portion SI2. In this case, the control device 50 sets the corresponding position CP for the specified patch SP to the patch cell PK in the printing characteristic area CR3 to which the portion SI1 having the larger area belongs (the patch cell PK in the second row and second column of FIG. 12B).

Figure 14A:
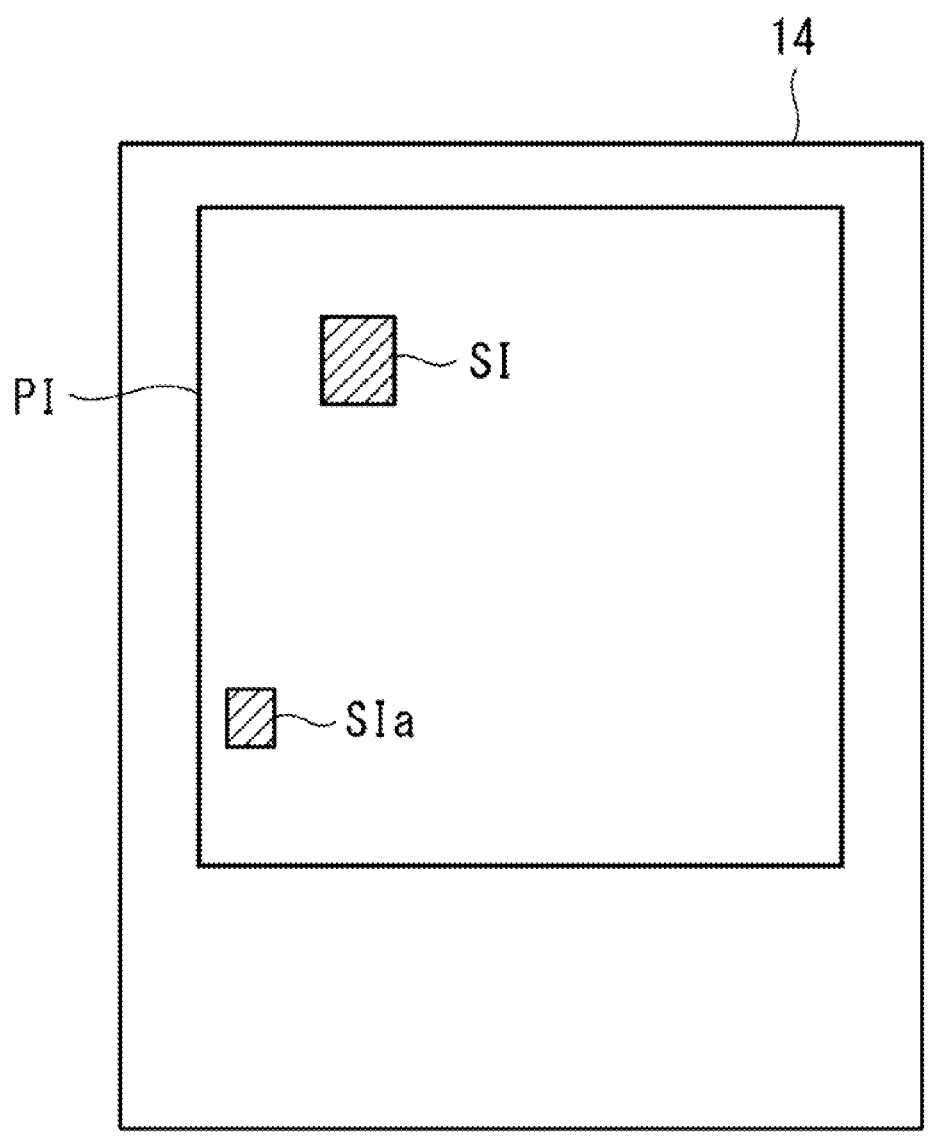
FIG. 14A illustrates another example of a specified image that a user has specified in a preview image of image data displayed on the display device.
Figure 14B:
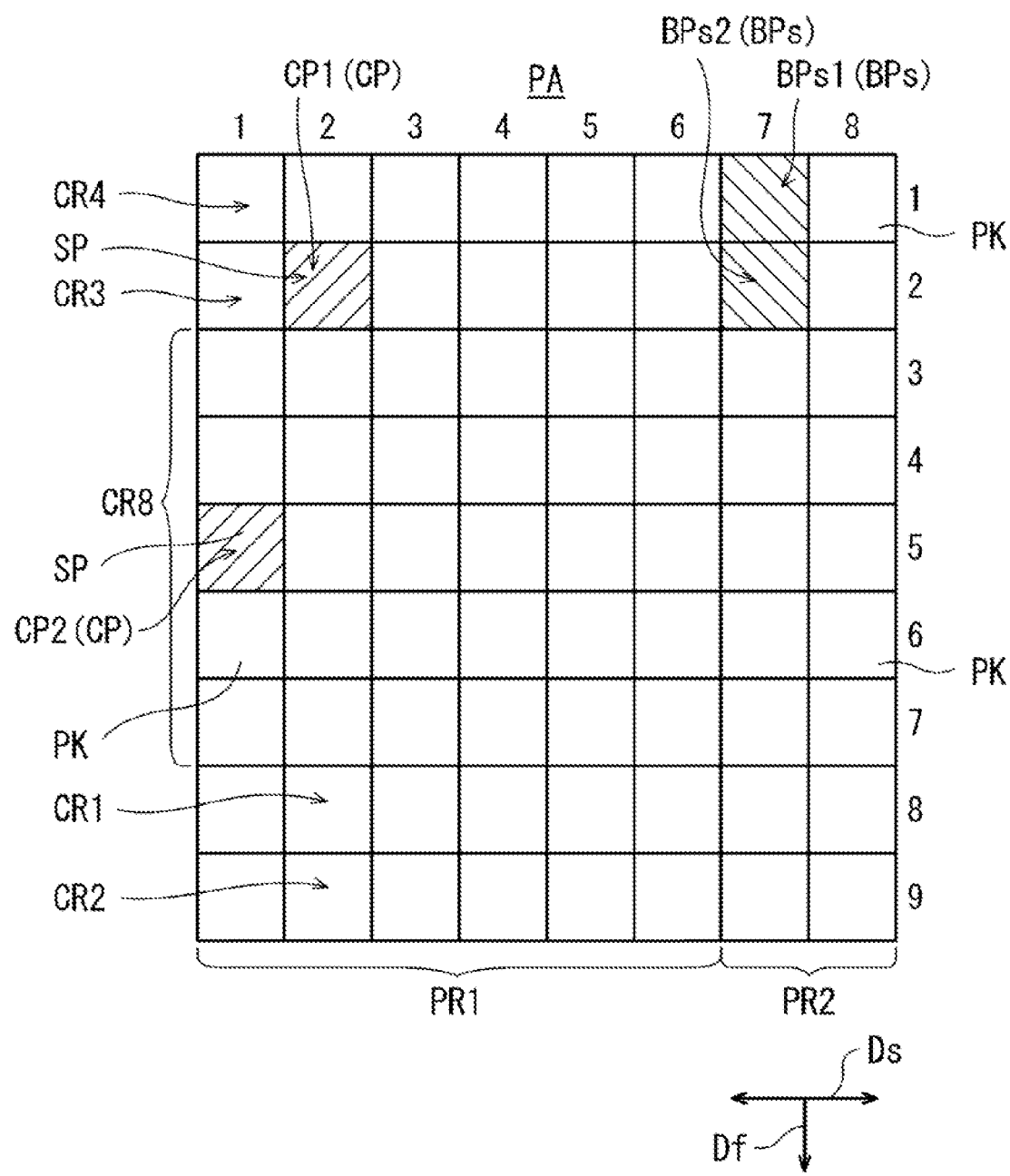
FIG. 14B illustrates the arrangement of a specified patch for the specified image of FIG. 14A in an overall patch image.

FIG. 14A shows another example of a specified image SI that the user has specified in a preview image PI of image data displayed on the display device 14. FIG. 14B shows the arrangement in the overall patch image PA of specified patches SP corresponding to the specified image SI in FIG. 14A.

In this example, the control device 50 determines whether the same color as the user-specified color exists elsewhere in the image data (i.e., whether the same color as the user-specified color exists elsewhere in the image represented by the image date). The control device 50 determines which of the printing characteristic areas CR the position in the overall patch image PA corresponding to the position of the specified color (the color of the specified image SI) in the image data belongs to. In addition to this determination, the control device 50 determines, for each position in image data having the same color as the specified color, which of the printing characteristic areas CR the position in the overall patch image PA corresponding to the position of the same color in the image data belongs. FIGS. 14A and 14B show an example in which the position in the overall patch image PA corresponding to the position of the specified image SI in image data belongs to the printing characteristic area CR3 and the position in the overall patch image PA corresponding to the position of an image SIa in the image data belongs to the printing characteristic area CR8. Note that the image SIa has the same color as the specified image SI.

When the positions in the overall patch image PA belong to two or more of the printing characteristic areas CR in this way (i.e., when not all the positions in the overall patch image PA belong to the same printing characteristic area CR), the control device 50 sets a corresponding position CP1 for the specified patch SP of the specified image SI to a patch cell PK in the printing characteristic area CR3 and sets a corresponding position CP2 for the patch of the image SIa (hereinafter also called a specified patch SP) to a patch cell PK in the printing characteristic area CR8, as illustrated in FIG. 14B. Next, before arranging the specified patch SP for the specified image SI, the control device 50 moves the basic patch BP originally arranged at the corresponding position CP1 to a vacant patch cell PK in the second patch area PR2 as a basic patch BPs1. Before arranging the specified patch SP for the image SIa, the control device 50 also moves the basic patch BP originally arranged at the corresponding position CP2 to an empty patch cell PK in the second patch area PR2 as a basic patch BPs2.

When the process shown in FIG. 14B is performed, the control device 50 may print the overall patch image PA in which the specified patches SP are arranged on a printing medium W and then measure the color of each specified patch SP with a colorimeter. In this case, the control device 50 can create a calibration profile based on data obtained by averaging the results of color measurements for each specified patch SP. That is, the control device 50 can create a calibration profile based on an average of the results of color measurements of the specified patches SP. For example, the control device 50 averages the results of color measurements by dividing the sum of the measured values by the number of measurements performed.

Figure 15A:
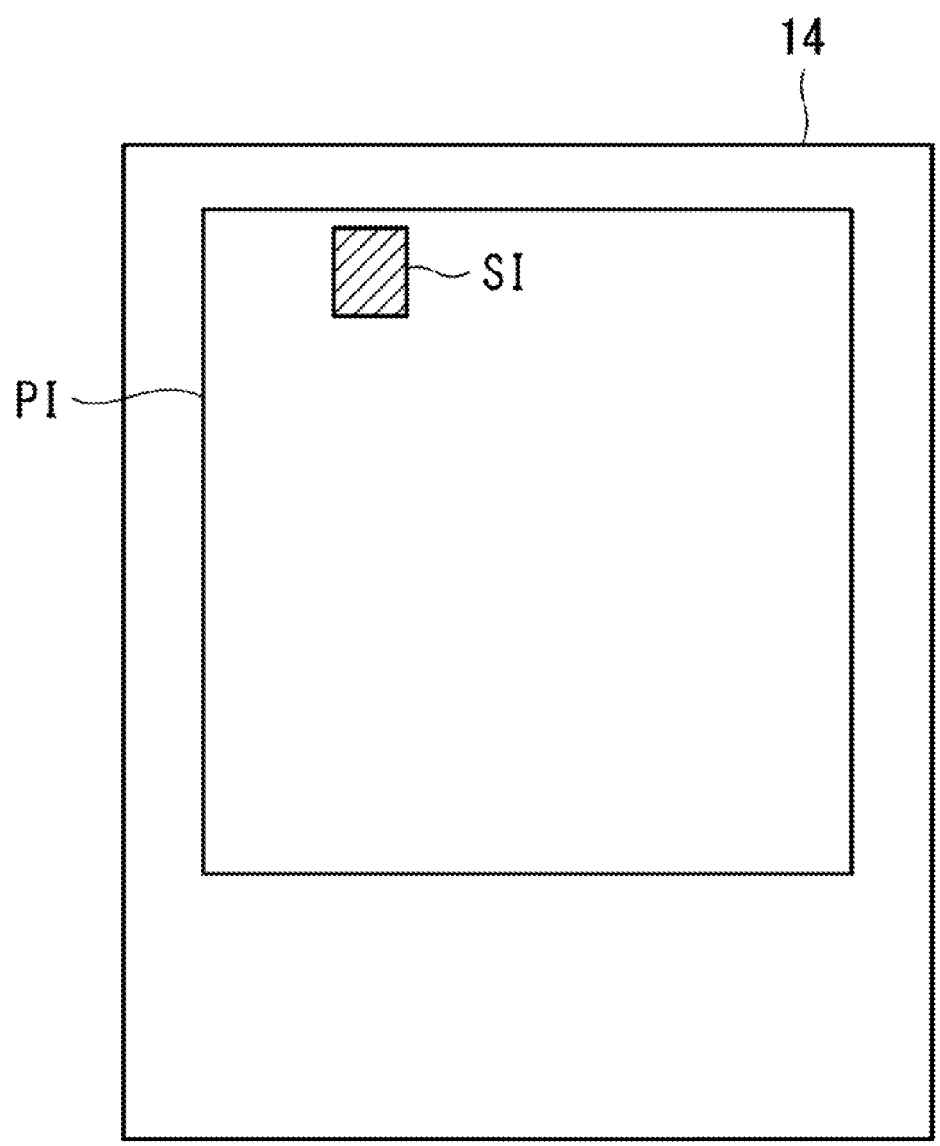
FIG. 15A illustrates another example of a specified image that a user has specified in a preview image of image data displayed on the display device.
Figure 15B:
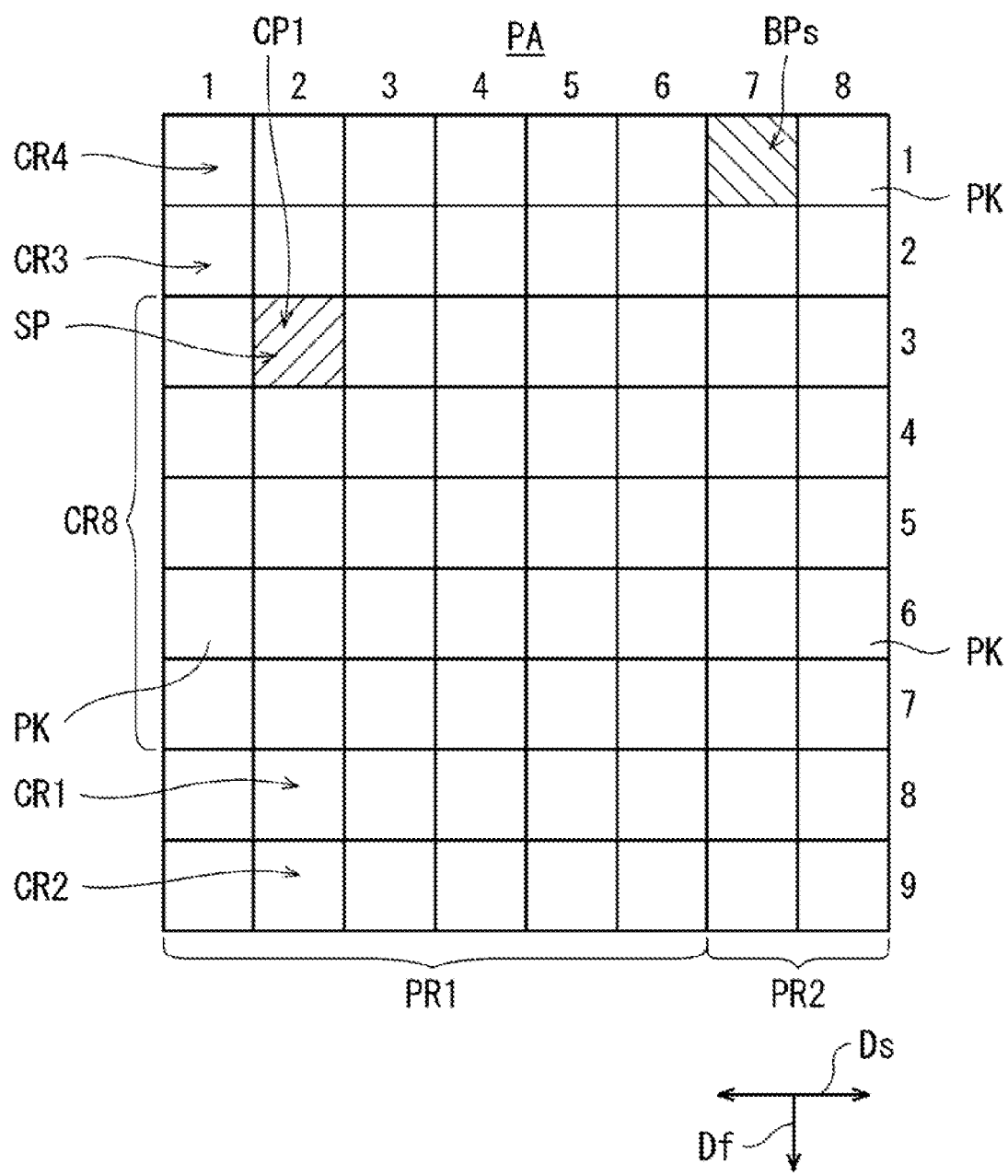
FIG. 15B illustrates the arrangement of a specified patch for the specified image of FIG. 15A in an overall patch image.

FIG. 15A shows another example of a specified image SI that the user has specified in a preview image PI of image data displayed on the display device 14. FIG. 15B shows the arrangement in the overall patch image PA of a specified patch SP corresponding to the specified image SI in FIG. 15A.

In this example, the control device 50 may determine which of a first printing characteristic area, a second printing characteristic area, and a third printing characteristic area the position in the overall patch image PA corresponding to the position of the specified image SI in image data (the user-specified color) belongs to. For example, the control device 50 determines whether the XY coordinates for the center of gravity of the specified image SI lie between the XY coordinates for the upper-left and lower-right corners of the first printing characteristic area, whether the XY coordinates for the center of gravity of the specified image SI lie between the XY coordinates for the upper-left and lower-right corners of the second printing characteristic area, and whether the XY coordinates for the center of gravity of the specified image SI lie between the XY coordinates for the upper-left and lower-right corners of the third printing characteristic area.

In FIG. 15B, the printing characteristic areas CR1 and CR2 correspond to the first printing characteristic area, the printing characteristic areas CR3 and CR4 correspond to the third printing characteristic area, and the printing characteristic area CR8 corresponds to the second printing characteristic area. The first printing characteristic area, the second printing characteristic area, and the third printing characteristic area are arranged in the conveying direction Df. Further, the conveying direction Df is an example of the prescribed direction. In FIGS. 15A and 15B, the above position will be assumed to belong to the third printing characteristic area (the printing characteristic areas CR3 and CR4).

When the position in the overall patch image PA corresponding to the position of the specified image SI (the user-specified color) in the image data belongs to either the first printing characteristic area or the third printing characteristic area, as in this example, the control device 50 may set the corresponding position CP for the specified patch SP corresponding to the specified image SI to a patch cell PK in the printing characteristic area CR8, which is the second printing characteristic area.

As described above, at a stage prior to printing the overall patch image PA, the printing device 1 moves the basic patch BP originally arranged at the corresponding position CP to a vacant patch cell PK in the second patch area PR2 before arranging the specified patch SP. Then, the printing device arranges the specified patch SP at the corresponding position CP in the first patch area PR1. Thus, when the specified patch SP belongs to an area where the accuracy of ink placement on the printing medium W may be degraded (i.e., an area where droplet positions may be imprecise due to the printing medium W being supported unstably by the conveying rollers 31), the possibility can be reduced that due to degradation of the accuracy of ink placement, the aforementioned specified patch SP will be printed in an area where the accuracy of ink placement is not degraded. In other words, arranging the specified patch SP in the first patch area PR1 can increase the possibility that the specified patch SP will be printed in an area where the accuracy of ink placement is degraded when the specified patch SP belongs to an area where the accuracy of ink placement may be degraded.

Furthermore, when the specified patch SP belongs to an area where ink placement accuracy cannot be degraded, the possibility can be reduced that due to degradation of ink placement accuracy, the specified patch SP will be printed in an area where ink placement accuracy may be degraded. In other words, arranging the specified patch SP in the first patch area PR1 can increase the possibility that the specified patch SP will be printed in an area where ink placement accuracy is not degraded when the specified patch SP belongs to an area where ink placement accuracy is not degraded. This arrangement can reduce the possibility that the position of the color specified by the user in the image data (i.e., the color intended for color calibration) will not match the position of the specified patch SP in the overall patch image PA printed on the printing medium W, thereby making suitable color calibration easier to perform than in the conventional technology and further improving the accuracy of color calibration. Further, since the basic patch BP is moved to the second patch area PR2 when the specified patch SP is arranged in the first patch area PR1, the loss of this basic patch BP can be avoided.

In the present embodiment, the control device 50 may arrange at the corresponding position CP the specified patch SP for a specified color of a plurality of specified colors excluding the specified color whose predetermined priority is the lowest among the plurality of specified colors, and may arrange the specified patch SP for a remaining color among the plurality of specified colors at an adjacent position AP adjacent to the corresponding position CP. Further, in the present embodiment, the control device 50 may arrange the specified patch SP for a specified color whose predetermined priority is the highest among a plurality of specified colors at the corresponding position CP and arrange the specified patch SP for a remaining color among the plurality of specified colors at an adjacent position AP adjacent to the corresponding position CP. This process can reduce the possibility that the positions of the plurality of colors for which the user wishes to perform color calibration do not match the positions of the specified patches SP in the overall patch image PA printed on the printing medium W, thereby improving the accuracy of color calibration for the plurality of colors.

In the present embodiment, when the position in the overall patch image PA corresponding to the position of the specified image SI (user-specified color) in the image data spans across two or more of the printing characteristic areas CR, the control device 50 may arrange the specified patch SP in a patch cell PK positioned across those printing characteristic areas CR. This method can improve the reproducibility of color for the specified patch SP arranged across the two or more of the printing characteristic areas CR.

In the present embodiment, the control device 50 may set the corresponding position CP for the specified patch SP of the specified image SI to a patch cell PK belonging to one of a plurality of printing characteristic area CR excluding the printing characteristic area CR whose color area in the image data is the smallest among the plurality of printing characteristic area CR. Furthermore, in the present embodiment, the control device 50 may set the corresponding position CP for the specified patch SP of the specified image SI to a patch cell PK belonging to the single printing characteristic areas CR having the largest color area among a plurality of printing characteristic areas CR (i.e., the single printing characteristic area CR that corresponds to the color in the image data having the larger range). This can improve reproducibility of the color in the specified patch SP without using a plurality of patch cells PK in the first patch area PR1 (i.e., without having to move a plurality of basic patches BP to the second patch area PR2).

In the present embodiment, when the positions in the overall patch image PA corresponding to the positions in image data of the color of the specified image SI and the same colors as the user-specified color belong to different printing characteristic areas CR, the control device 50 may arrange each specified patch SP in a patch cell PK of the corresponding printing characteristic area CR. Accordingly, this method can improve reproducibility of the color in the specified patches SP.

In the present embodiment, the control device 50 may set the corresponding position CP1 for the specified patch SP of the specified image SI to a patch cell PK of the printing characteristic area CR3 and set the corresponding position CP2 for the specified patch SP corresponding to the image SIa to a patch cell PK of the printing characteristic area CR8. Next, the control device 50 may print the overall patch image PA with the specified patches SP arranged therein on a printing medium W and then measure the color of each specified patch SP with a colorimeter. Thereafter, the control device 50 may also create a calibration profile based on data obtained by averaging the results of color measurements for the specified patches SP. By averaging the measurement results for the specified patches SP in this way, the control device 50 can suppress bias in the measurement results, thereby improving the reproducibility of colors printed according to the calibration profile.

In the present embodiment, when the position in the overall patch image PA corresponding to the position of the specified image SI (a user-specified color) in image data belongs to either the first printing characteristic area or third printing characteristic area, the control device 50 may set a patch cell PK in the second printing characteristic area as the corresponding position CP. Therefore, a color measurement on the color of the specified patch SP can be performed in the printing characteristic area CR8, which is a stable area.

Further, by arranging a specified patch SP in a patch cell PK set as the corresponding position CP in the printing characteristic areas CR1-CR6 in the present embodiment, the control device 50 can improve reproducibility of the printed color by taking into account the printing characteristics of the respective areas.

Variations of the Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the boundary between any two adjacent printing characteristic areas CR may be aligned with a boundary between two adjacent patch cells PK (see the example in FIG. 13) or some (see the example in FIG. 7) or all of the boundaries between printing characteristic areas CR may be not aligned with boundaries between patch cells PK.

In the embodiment described above, the printing characteristic areas CR1-CR8 in the overall patch image PA may be set arbitrarily. For example, the printing characteristic area CR1 may be set larger by one row worth of patch cells PK to the upstream side in the conveying direction Df, and the printing characteristic area CR3 may be set larger by one row worth of patch cells PK to the downstream side in the conveying direction Df.

Further, while the preview image PI is displayed on the display device 14 of the printing device 1 in the embodiment described above, the present disclosure is not limited to this method. For example, the preview image PI may be displayed on the display of an external device such as a personal computer or the like that can communicate with the printing device 1 through cables or wirelessly.

While an inkjet printer serves as an example of the printing device 1 in the embodiment described above, the printing device 1 may be another printer, such as a laser printer or a thermal printer. A laser printer is provided with a printing engine. The printing engine of the laser printer includes an image carrier such as a photosensitive drum or a photosensitive belt, a charger that charges the image carrier through contact or non-contact, an exposure unit that forms an electrostatic latent image on the charged image carrier using a laser semiconductor or the like (known as "exposure"), a toner cartridge or developing cartridge that supplies toner to the image carrier on which an electrostatic latent image has been formed, a transfer unit such as a transfer roller or transfer belt that transfers the developed toner image from the image carrier directly to a print medium, and a fixing unit such as a fixing roller or fixing belt that thermally fixes the toner (the toner image) transferred onto the print medium. The laser printer is not limited to a direct tandem laser printer but may be an intermediate transfer laser printer. The intermediate transfer laser printer first transfers the developed toner image from the image carrier onto an intermediate transfer belt and then uses the transfer unit to transfer the toner image from the intermediate transfer belt onto the print medium. A thermal printer is provided with a printing engine. The printing engine of the thermal printer includes a thermal head, and an ink ribbon. The thermal head contacts the ink ribbon and transfers ink in the ink ribbon onto a print medium by causing the corresponding heating elements to generate heat.

While the printing device 1 is a serial printer in the embodiment described above, the printing device 1 may also be a line printer.

In the embodiment described above, the control device 50 determines whether the XY coordinates of the center of gravity of the specified image SI lie between the XY coordinates of the upper-left and lower-right corners of the first printing characteristic area, whether the XY coordinates of the center of gravity of the specified image SI lie between the XY coordinates of the upper-left and lower-right corners of the second printing characteristic area, and whether the XY coordinates of the center of gravity of the specified image SI lie between the XY coordinates of the upper-left and lower-right corners of the third printing characteristic area, but the present disclosure is not limited to this method. For example, the control device 50 may determine whether the XY coordinates of both the upper-left corner and lower-right corner of the specified image SI lie between the XY coordinates of the upper-left and lower-right corners of the first printing characteristic area, whether the XY coordinates of both the upper-left corner and lower-right corner of the specified image SI lie between the XY coordinates of the upper-left and lower-right corners of the second printing characteristic area, and whether the XY coordinates of both the upper-left corner and lower-right corner of the specified image SI lie between the XY coordinates of the upper-left and lower-right corners of the third printing characteristic area.

In the above embodiment, the first printing mode is a mode for printing by ejecting ink droplets from the first number of nozzles 27 in the ejection heads 20 while the carriage 41 moves in the moving direction Ds, and the second printing mode is a mode for printing by ejecting ink droplets from the second number of nozzles 27 in the ejection heads 20 while the carriage 41 moves in the moving direction Ds. The first number of nozzles 27 are arranged consecutively in the conveying direction Df, the second number of nozzles 27 are arranged consecutively in the conveying direction Df, and the second number is greater than the first number. However, the present disclosure is not limited to this configuration. For example, the total number of nozzles 27 ejecting ink droplets in the second printing mode may simply be greater than the total number of nozzles 27 ejecting ink droplets in the first printing mode.

In the embodiment described above, when creating a calibration profile based on an average of the color measurement results for specified patches SP, the control device 50 averages the color measurement results by dividing the sum of the measured values by the number of measurements. However, the present disclosure is not limited to this method. For example, the control device 50 may average the color measurement results by first excluding the maximum and minimum values from all measured values and then dividing the sum of the remaining measured values by the number of total measurements minus 2.

What is claimed is:

1. A printing device comprising:
   a printing engine configured to print an image on a printing medium based on image data;
   a storage unit storing an overall patch image including a plurality of patches for color calibration for printing the image, the plurality of patches including a plurality of basic patches corresponding to a plurality of predetermined colors, the overall patch image having a first patch area in which the plurality of basic patches is arranged and a second patch area different from the first patch area; and
   a controller,
   wherein the controller is configured to perform:
   (a) generating a specified patch, the specified patch being a patch for a specified color, the specified color being a color specified in a preview image corresponding to the image;
   (b) determining whether a corresponding position for the specified patch falls within the first patch area, the corresponding position being a position in the overall patch image that corresponds to a position of the specified color in the preview image;
   (c) moving, when determining in (b) that the corresponding position falls within the first patch area, a corresponding basic patch from the first patch area to the second patch area, the corresponding basic patch being one of the plurality of basic patches that is originally arranged at the corresponding position; and
   (d) printing the overall patch image using the printing engine, and
   wherein, in a case where the specified patch is generated in (a) and the corresponding position is determined in (b) to fall within the first patch area, in the printing in (d) the specified patch generated in (a) is printed in the first patch area and the corresponding basic patch is printed in the second patch area.

2. The printing device according to claim 1,
   wherein the controller is configured to further perform:
   (e) arranging, prior to performing the printing in (d), the specified patch generated in (a) at the corresponding position.

3. The printing device according to claim 2,
   wherein the storage unit stores information on a plurality of printing characteristic areas, the printing characteristic areas being areas in the overall patch image, the printing characteristic areas having different printing characteristics with respect to a reproducibility of printing colors,
   wherein the controller is configured to further perform:
   (f) determining whether a specific position belongs to two or more of the printing characteristic areas, the specific position being a position in the overall patch image, the specific position corresponding to a position of the specified color in the image data;
   (g) determining, when determining in (f) that the specific position belongs to two or more of the printing characteristic areas, whether the specific position spans across two or more of the printing characteristic areas; and (h) setting, when determining in (g) that the specific position spans across two or more of the printing characteristic areas, the corresponding position for the specified patch to a position spanning across the two or more of the printing characteristic areas across which the specific position spans.

4. The printing device according to claim 2, wherein the storage unit stores information on a plurality of printing characteristic areas, the printing characteristic areas being areas in the overall patch image, the printing characteristic areas having different printing characteristics with respect to a reproducibility of printing colors, wherein the controller is configured to further perform:

(f) determining whether a specific position belongs to two or more of the printing characteristic areas, the specific position being a position in the overall patch image, the specific position corresponding to a position of the specified color in the image data; and (g) setting, when determining in (f) that the specific position belongs to two or more of the printing characteristic areas, the corresponding position for the specified patch in one of the two or more of the printing characteristic areas excluding the printing characteristic area whose color area in the image data is the lowest among the two or more of the printing characteristic areas, the color area being a portion of the printing characteristic area to which the specified color belongs.

5. The printing device according to claim 2, wherein the storage unit stores information on a plurality of printing characteristic areas, the printing characteristic areas being areas in the overall patch image, the printing characteristic areas having different printing characteristics with respect to a reproducibility of printing colors, wherein the controller is configured to further perform:

(f) determining whether a specific position belongs to two or more of the printing characteristic areas, the specific position being a position in the overall patch image, the specific position corresponding to a position of the specified color in the image data; and (g) setting, when determining in (f) that the specific position belongs to two or more of the printing characteristic areas, the corresponding position for the specified patch in each of the two or more of the printing characteristic areas.

6. The printing device according to claim 5, wherein the controller is configured to further perform:

(h) measuring, after performing the printing in (d), the colors of the printed specified patches arranged at the corresponding positions set in the two or more of the printing characteristic areas; and (i) creating a calibration profile based on data obtained by averaging color measurements results for the specified patches.

7. The printing device according to claim 2, wherein the storage unit stores information on a plurality of printing characteristic areas, the printing characteristic areas being areas in the overall patch image, the printing characteristic areas having different printing characteristics with respect to a reproducibility of printing colors, wherein the printing characteristic areas include a first printing characteristic area, a second printing characteristic area, and a third printing characteristic area, wherein the first printing characteristic area, the second printing characteristic area and the third printing characteristic area are arranged in a prescribed direction, and wherein the controller is configured to further perform:

(f) determining which of the first printing characteristic area, the second printing characteristic area, and the third printing characteristic area a specific position belongs to, the specific position being a position in the overall patch image, the specific position corresponding to a position of the specified color in the image data; and (g) setting, when determining in (f) that the specific position belongs to either the first printing characteristic area or the third printing characteristic area, the corresponding position for the specified patch in the second printing characteristic area.

8. The printing device according to claim 2, further comprising:

a first conveying unit configured to convey the printing medium in a conveying direction, the first conveying unit being positioned on an upstream side in the conveying direction; and a second conveying unit configured to convey the printing medium in the conveying direction, the second conveying unit being positioned on a downstream side in the conveying direction, wherein the printing engine is an ejection head including a plurality of nozzles for ejecting ink droplets, wherein the storage unit stores information on a plurality of printing characteristic areas, the printing characteristic areas being areas in the overall patch image, the printing characteristic areas having different printing characteristics with respect to a reproducibility of printing colors, and wherein one of the printing characteristic areas is an area in which printing is performed on the printing medium by the ejection head while the printing medium is conveyed by the first conveying unit without being conveyed by the second conveying unit.

9. The printing device according to claim 8, further comprising:

a moving unit on which the ejection head is mounted, the moving unit being configured to move in a direction crossing the conveying direction, wherein the controller is configured to switch a printing mode between:

a first printing mode in which the controller performs printing by controlling the ejection head to eject ink droplets from a first number of nozzles while moving the moving unit; and a second printing mode in which the controller performs printing by controlling the ejection head to eject ink droplets from a second number of nozzles while moving the moving unit, the second number being greater than the first number, and wherein one of the printing characteristic areas is an area in which printing is performed under the first printing mode.

10. The printing device according to claim 8, further comprising:

a moving unit on which the ejection head is mounted, the moving unit being configured to move in a direction crossing the conveying direction, wherein the controller is configured to switch a printing mode between:
  a first printing mode in which the controller performs printing by controlling the ejection head to eject ink droplets from a first number of nozzles while moving the moving unit; and
  a second printing mode in which the controller performs printing by controlling the ejection head to eject ink droplets from a second number of nozzles while moving the moving unit, the second number being greater than the first number, and
wherein one of the printing characteristic areas is an area in which printing is performed under the second printing mode.

11. The printing device according to claim 2, further comprising:
  a first conveying unit configured to convey the printing medium in a conveying direction, the first conveying unit being positioned on an upstream side in the conveying direction;
  a second conveying unit configured to convey the printing medium in the conveying direction, the second conveying unit being positioned on a downstream side in the conveying direction; and
  a holding member configured to hold down the printing medium in a vertical direction, the holding member being positioned between the printing engine and the first conveying unit,
wherein the printing engine is an ejection head including a plurality of nozzles for ejecting ink droplets,
wherein the storage unit stores information on a plurality of printing characteristic areas, the printing characteristic areas being areas in the overall patch image, the printing characteristic areas having different printing characteristics with respect to a reproducibility of printing colors, and
wherein one of the printing characteristic areas is an area in which printing is performed on the printing medium by the ejection head while the printing medium is conveyed by the second conveying unit and is held down by the holding member without being conveyed by the first conveying unit.

12. The printing device according to claim 2, further comprising:
  a first conveying unit configured to convey the printing medium in a conveying direction, the first conveying unit being positioned on an upstream side in the conveying direction;
  a second conveying unit configured to convey the printing medium in the conveying direction, the second conveying unit being positioned on a downstream side in the conveying direction; and
  a holding member configured to hold down the printing medium in a vertical direction, the holding member being positioned between the printing engine and the first conveying unit,
wherein the printing engine is an ejection head including a plurality of nozzles for ejecting ink droplets,
wherein the storage unit stores information on a plurality of printing characteristic areas, the printing characteristic areas being areas in the overall patch image, the printing characteristic areas having different printing characteristics with respect to a reproducibility of printing colors, and
wherein one of the printing characteristic areas is an area in which printing is performed on the printing medium by the ejection head while the printing medium is conveyed by the second conveying unit without being held down by the holding member and without being conveyed by the first conveying unit.

13. The printing device according to claim 2, further comprising:
  a moving unit on which the printing engine is mounted, the moving unit being configured to move in a direction crossing a conveying direction of the printing medium,
wherein the printing engine is an ejection head including a plurality of nozzles for ejecting ink droplets,
wherein the storage unit stores information on a plurality of printing characteristic areas, the printing characteristic areas being areas in the overall patch image, the printing characteristic areas having different printing characteristics with respect to a reproducibility of printing colors, and
wherein one of the printing characteristic areas is an acceleration area in which the moving unit moves while accelerating or a deceleration area in which the moving unit moves while decelerating.

14. The printing device according to claim 1,
wherein the patch is a patch image having a prescribed shape and area,
wherein the controller is configured to further perform, when a plurality of colors are specified and the corresponding positions for the specified colors fall in the same patch image in the overall patch image:
  (e) arranging, at the corresponding position, the specified patch for one of the specified colors excluding the specified color whose predetermined priority is the lowest among the specified colors; and
  (f) arranging the specified patch for another of the specified colors at an adjacent position adjacent to the corresponding position.

15. A printing method comprising:
  (a) storing an overall patch image including a plurality of patches for color calibration for printing an image based on image data, the plurality of patches including a plurality of basic patches corresponding to a plurality of predetermined colors, the overall patch image having a first patch area in which the plurality of basic patches is arranged and a second patch area different from the first patch area;
  (b) generating a specified patch, the specified patch being a patch for a specified color, the specified color being a color specified in a preview image corresponding to the image;
  (c) determining whether a corresponding position for the specified patch falls within the first patch area, the corresponding position being a position in the overall patch image that corresponds to a position of the specified color in the preview image;
  (d) moving, when determining in (c) that the corresponding position falls within the first patch area, a corresponding basic patch from the first patch area to the second patch area, the corresponding basic patch being one of the plurality of basic patches that is originally arranged at the corresponding position; and
  (e) printing the overall patch image,
wherein, in a case where the specified patch is generated in (b) and the corresponding position is determined in (c) to fall within the first patch area, in the printing in (c) thein (e) the specified patch generated in (b) is printed in the first patch area and the corresponding basic patch is printed in the second patch area.

16. A non-transitory computer-readable storage medium storing a set of instructions for a printing device including a controller and a printing engine configured to print an image on a printing medium based on image data, the set of instructions, when executed by the controller, causing the printing device to perform:

(a) storing an overall patch image including a plurality of patches for color calibration for printing the image, the plurality of patches including a plurality of basic patches corresponding to a plurality of predetermined colors, the overall patch image having a first patch area in which the plurality of basic patches is arranged and a second patch area different from the first patch area;

(b) generating a specified patch, the specified patch being a patch for a specified color, the specified color being a color specified in a preview image corresponding to the image;

(c) determining whether a corresponding position for the specified patch falls within the first patch area, the corresponding position being a position in the overall patch image that corresponds to a position of the specified color in the preview image;

(d) moving, when determining in (c) that the corresponding position falls within the first patch area, a corresponding basic patch from the first patch area to the second patch area, the corresponding basic patch being one of the plurality of basic patches that is originally arranged at the corresponding position; and (e) printing the overall patch image using the printing engine, wherein, in a case where the specified patch is generated in (b) and the corresponding position is determined in (c) to fall within the first patch area, in the printing in (e) the specified patch generated in (b) is printed in the first patch area and the corresponding basic patch is printed in the second patch area.

* * * * *